United States Patent [19]

Goldstein

[11] Patent Number: 5,244,553

[45] Date of Patent: Sep. 14, 1993

[54] METHOD FOR RECOVERING ACID FROM AN ACID-SUGAR HYDROLYZATE

[75] Inventor: Irving S. Goldstein, Cary, N.C.

[73] Assignee: North Carolina State University, Raleigh, N.C.

[21] Appl. No.: 785,343

[22] Filed: Oct. 31, 1991

[51] Int. Cl.$^5$ ............................................. B01D 61/44
[52] U.S. Cl. ................................ 204/182.4; 204/138; 204/151; 127/37; 127/46.2; 127/54
[58] Field of Search .................... 204/182.4, 138, 151; 127/37, 54, 46.2

[56] References Cited

U.S. PATENT DOCUMENTS 4,612,286  9/1986  Sherman et al. .................... 435/157

OTHER PUBLICATIONS

Goldstein et al., "Acid Recovery by Electrodialysis and its Economic Implications for Concentrated Acid Hydrolysis of Wood" (1989) pp. 95–106, Applied Biochemistry and Biotechnology.

"Sklarewitz, An Engineering and Economic Analysis for HEI recovery by Electrodialysis in concentrated Acid Wood Hydrolysis". PHD dissertation, North Carolina State University (1984).

Wright, Power & Bergeron, *Evalution of Concentrated Hologen Acid Hydrolysis Process for Alcohol Fuel Production*, Solar Energy Research Institute/TR-232-2386, Secs. 3, 5–6 (Jun. 1985).

Goldstein, Bayat-Makooi, Sabharwal & Singh, Applied Biochemistry and Biotechnology, *Acid Recovery by Electrodialysis and its Economic Implications for Concentrated Acid Hydrolysis of Wood, Applied Biochemistry and Biotechnology* 20/21:95–106 (1989).

Nguyen, Venkatesh, Marsland & Goldstein, *Applications of Gems to Preliminary Process Design and Economic Analysis for an Integrated Wood Hydrolysis Plant*, AICHE Symposium Series 77:85–92 (1981).

Sklarewitz & Goldstein, *Recycle of Hydrochloric Acid In A Wood Hydrolysis Plant By Membrane Technology*, InterAmerican Congress of Chemical Engineering (Santiago, Chile 1983).

Sklarewitz, *An Engineering and Economic Analysis For HCl Recovery by Electrodialysis in Concentrated Acid Wood Hydrolysis*, (Ph.D. Dissertation, North Carolina State University, 1984).

Oshima, *Wood Chemistry—Process Engineering Aspects* 31–33 (1964).

Locke & Garnum, *Working Party on Wood Hydrolysis*, Forest Products Journal 11:380–82 (Aug. 1961).

*Primary Examiner*—John Niebling
*Assistant Examiner*—Arun S. Phasge
*Attorney, Agent, or Firm*—Bell, Seltzer, Park & Gibson

[57] ABSTRACT

The invention discloses a method for separating acid from an acid-sugar hydrolyzate in an electrodialysis apparatus comprising the steps of continuously passing the hydrolyzate through a diluate compartment of the electrodialysis apparatus, continuously passing a carrier fluid through a concentrate compartment of the electrodialysis apparatus, and maintaining a current between the anode-cathode pair of the electrodialysis apparatus that forces the anions and cations of the acid to migrate from the diluate compartment into a concentrate compartment.

39 Claims, 18 Drawing Sheets

METHOD FOR RECOVERING ACID FROM AN ACID-SUGAR HYDROLYZATE

FIELD OF THE INVENTION

The invention relates generally to recycling of solid waste, and more specifically to concentrated acid hydrolysis of cellulose-containing materials.

BACKGROUND OF THE INVENTION

Concentrated acid hydrolysis of cellulose-containing material is effective on any substrate without pretreatment, can provide almost quantitative yields of fermentable glucose, affords less dilute solutions for fermentation, takes place in minutes and affords a relatively reactive lignin residue with potential by-product value. In contrast, neither dilute acid hydrolysis nor enzymatic hydrolysis can claim more than two of these attributes.

The critical drawback of concentrated acid hydrolysis processes has been the recovery cost of the acid. Most development work has been based on halogen acids because of their volatility. In an economic analysis of a hypothetical integrated wood hydrolysis plant using concentrated HCl it was determined that over 35 percent of the operating costs and almost 40 percent of the capital costs were related to HCl recovery and loss. See Nguyen et al., *AIChE Symposium Series,* 77:85-92 (1981). A more recent economic evaluation of concentrated halogen acid (including HCl and HF) hydrolysis processes, Wright et al., *Evaluation of Concentrated Halogen Acid Hydrolysis Processes for Alcohol Fuel Production,* SERI/TR-232-2386, Solar Energy Research Institute, Golden, Colo. (June 1985), confirmed that they are all expensive because of the high cost of acid recovery.

Although sulfuric acid is much cheaper than the halogen acids, it is not volatile and cannot be recovered by distillation. Even so, it was used in two uneconomical Japanese processes. In the Hokkaido process, described in Oshima, *Wood Chemistry Process Engineering Aspects,* Noyes Development, New York (1965), acid recovery depended on diffusion dialysis with an anion-exchange membrane. In the other process the sulfuric acid was neutralized with lime, and the resultant gypsum used for gypsum board manufacture. See Locke et al., Forest Products Journal 11:380 (1961).

Recent research has been directed at overcoming the recovery problem by the use of lower energy membrane separation technology. Simulation studies showed potentially large savings in recovery costs by electrodialysis. See Sklarewitz et al., *Recycle of Hydrochloric Acid in a Wood Hydrolysis Plant by Membrane Technology,* X InterAmerican Congress of Chemical Engineering, Santiago, Chile (Nov. 9, 1983); Sklarewitz, *An Engineering and Economic Analysis for HCl Recovery by Electrodialysis in Concentrated Acid Wood Hydrolysis,* North Carolina State University (1984). Ideally, the separation of HCl from the sugar in the hydrolyzate by electrodialysis should provide a maximum yield of recovered acid in maximum concentration at minimum power consumption with minimum membrane area; however, these conditions cannot be met simultaneously. At the highest current efficiencies and resultant lowest membrane area requirements, the final acid concentration in the concentrate solution is unacceptably low. At the highest final acid concentrations the percentage of acid transferred drops off and power consumption and membrane area are high. The present invention is a result of efforts to overcome these problems.

SUMMARY OF THE INVENTION

A first aspect of the present invention is a method for separating acid from an acid-sugar hydrolyzate containing hydrochloric acid in concentration of between 14 and 17 percent in an electrodialysis apparatus which comprises the steps of continuously passing the hydrolyzate through at least one diluate compartment of the electrodialysis apparatus, continuously passing a carrier fluid through at least one concentrate compartment of the electrodialysis apparatus, and maintaining a current between the anode-cathode pair of the electrodialysis apparatus that forces the anions and cations of the acid component of the hydrolyzate to migrate into an acid compartment. Experimentation has demonstrated that at this preferred concentration in the presence of sugar, there is a reduction in the electrical power needed to transfer the acid to the carrier fluid to a level below that predicted by experiments at other acid concentrations. It is preferred that the method have a current efficiency of between 0.57 and 0.63 Moles/F/Cell and a power/acid transport ratio of between 0.47 and 0.53 KWhr/lb HCl.

A second aspect of the invention is a method for separating acid from an acid-sugar hydrolyzate containing sulfuric acid in concentration of between 9 and 11 percent in an electrodialysis apparatus which comprises the steps of continuously passing the hydrolyzate through at least one diluate compartment of the electrodialysis apparatus, continuously passing a carrier fluid through at least one concentrate compartment of the electrodialysis apparatus, and maintaining a current between the anode-cathode pair of the electrodialysis apparatus that forces the anions and cations of the acid component of the hydrolyzate to migrate into an acid compartment. As described above, it has been seen that at this concentration in the presence of sugar, the electrical power needed to carry out the method is lower than expected. It is preferred that the method have a current efficiency of between 0.22 and 0.24 Moles/F/Cell and a power/acid transport ratio of 0.57 to 0.63 KWhr/Lb $H_2SO_4$.

A third aspect of the invention is a method for separating acid from a hydrolyzate in an electrodialysis apparatus that comprises the steps of continuously passing the hydrolyzate through at least one diluate compartment of the electrodialysis apparatus, continuously passing a carrier fluid through at least one concentrate compartment of the electrodialysis apparatus, maintaining a current between the anode-cathode pair of the electrodialysis apparatus that forces the cations and anions of the acid component of the hydrolyzate to migrate to at least one of the concentrate compartments of the electrodialysis apparatus, and ceasing the method when the acid concentration of the concentrate reaches a predetermined level. Preferred is ceasing the method at between 19 and 21 percent acid concentration when hydrochloric acid is recovered, and at 21 to 23 percent acid concentration when sulfuric acid is recovered. These final concentrations are preferred because the experimentation described below indicates that achieving higher final concentrations reduces current efficiency and thus raises power costs significantly.

The foregoing and other aspects of the invention are explained in detail in the drawings and specification hereinbelow.

DETAILED DESCRIPTION OF THE INVENTION

The method of electrodialysis is employed to selectively transfer low molecular weight ionized chemical species from one fluid stream into another. It is an electrical current driven separation process that utilizes thin cationic permeable and anionic permeable membranes to separate the electrolytic components of the fluid stream. Cationic permeable membranes allow the passage of cationic species such as $H^+$, but block the passage of anions and non-electrolytes. Anionic permeable membranes allow the passage of anions such as $Cl^-$ and $SC_4^{2-}$ but block the passage of cations and non-electrolytes.

Figure 1:
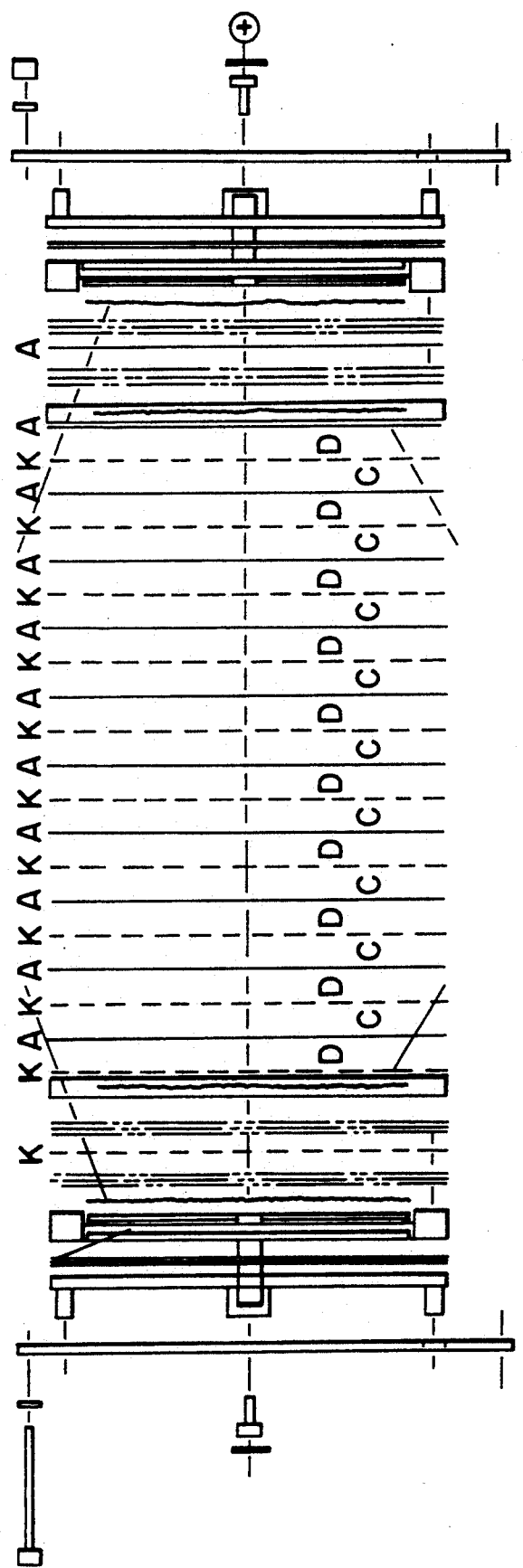
FIG. 1 is a schematic diagram of a typical Electrodialysis apparatus.

A series of alternating parallel cation and anion membranes are placed in a frame and electric current is applied to electrodes on either end of this membrane "stack" (see FIG. 1). When solution enters the stack cations are drawn by the current toward the anode and travel in that direction until prevented from doing so by an anodic membrane. Similarly, anions in solution travel toward the cathode until halted by a cathodic membrane. The result is compartments that alternatively contain ionically concentrated and ionically dilute solutions. Because the ionically-concentrated compartments are hydraulically connected, the solutions contained in each of these compartments are combined into a single concentrate and recycled back into an acid concentrate compartment to accept more acid from the diluate. Similarly, the diluate is transported from a diluate compartment, combined with diluates from other diluate compartments, and then recycled back to a diluate compartment to further donate acid to the concentrate.

The present invention employs such a method for recovering the acid component from an acid-sugar hydrolyzate. The electrodialysis apparatus includes at least one diluate compartment, at least one acid concentrate compartment, and an anode-cathode pair for providing an electric current across the apparatus. The method comprises the steps of continuously passing the hydrolyzate through the diluate compartment or compartments of an electrodialysis apparatus, continuously passing a carrier fluid through the acid compartment or compartments of the electrodialysis apparatus, and maintaining an electrical current through the apparatus that forces the ions of the acid component of the hydrolyzate to migrate into an acid concentrate compartment and thus join the carrier fluid.

The hydrolyzate is generally composed of an acid and sugar solution resulting from the acid hydrolysis of cellulosic waste. The cellulosic waste itself can include any paper, wood, agricultural residue, or other cellulose-containing material known in the art to be hydrolyzable into sugar fragments by acid. The acid component of the hydrolyzate can be any acid known to hydrolyze cellulose-containing material. Exemplary acids include hydrochloric acid and sulfuric acid. Any acid/cellulose ratio known to successfully hydrolyze the cellulose is suitable. A typical hydrochloric acid/cellulose ratio is two parts 45 percent HCl to one part cellulosic waste. A typical sulfuric acid/cellulose ratio is two parts 68 percent sulfuric acid to one part cellulose. The cellulosic sugar fragments resulting from hydrolysis can include glucose, cellobiose, and larger oligosaccharides.

The initial concentration of the cellulosic hydrolysis products (sugars) in the diluate can be 0.5 to 5.0 parts sugars to one part acid, and more preferably is 3.25 to 4.25 parts sugars to one part HCl and 0.75 to 1.25 parts sugars to one part sulfuric acid. These concentrations will generally require that the hydrolysis product be diluted before the diluate enters the electrodialysis apparatus, and further require that a large percentage of the HCl present in the hydrolyzate be stripped by some known means prior to electrodialysis.

If hydrochloric acid is the acid to be recovered from the hydrolyzate, the initial concentration of the acid in the diluate is preferably 12 to 19 percent, and is most preferably 14 to 17 percent. If sulfuric acid is the acid to be recovered from the hydrolyzate, the initial concentration can be 6 to 14 percent, and is more preferably 9 to 11 percent.

The carrier fluid can be water or an aqueous acid solution of whatever acid is to be recovered from the hydrolyzate. The initial concentration of hydrochloric acid in the carrier fluid can be from 0 to 25 percent. The initial concentration of sulfuric acid in the carrier fluid can be from 0 to 30 percent. The acid concentration of the acid concentrate solution should be sufficiently low that back diffusion of the concentrate into the diluate is minimized. It should also be recognized that a lower concentration carrier fluid will initially accept acid more easily with greater electrical efficiency, but will require more total energy to achieve the same final concentration than a fluid having a higher initial acid concentration.

The power required to carry out the method will depend on the number of compartments within the membrane stack, the membrane area of the cells, and the acid to be recovered. Power can be compared between different electrodialysis units through the use of power/acid transport and current efficiency ratios described in Example 2 below.

If hydrochloric acid is to be recovered, a power/acid transport ratio of between 0.35 to 0.7 Kilowatt-Hours/pound HCl (KWhr/lbHCl) transferred is suitable. More preferred is a ratio of between 0.47 and 0.53 KWhr/lbHCl. A current efficiency of between 0.45 and 0.75 Moles/Faraday/Cell (Moles/F/Cell) is suitable, with a current efficiency of 0.57 to 0.63 Moles/F/Cell being more preferred. If sulfuric acid is to be recovered, a power/acid transport ratio of between 0.55 and 0.75 KWhr/lbH$_2$SO$_4$ is suitable; a preferred ratio is between 0.57 and 0.63 KWhr/lbH$_2$SO$_4$. A current efficiency of between 0.15 to 0.27 Moles/F/Cell is suitable for sulfuric acid, with a current efficiency of between 0.22 and 0.24 Moles/F/Cell being more preferred.

Cessation of the method will depend on the acid to be recovered and its desired final concentration. If hydrochloric acid is recovered, the method can be ceased when the final concentrate concentration reaches from 15 to 25 percent, and is most preferably ceased when the final concentrate concentration reaches between 19 to 21 percent. If sulfuric acid is recovered, the final concentrate concentration can be from 18 to 28 percent, and is more preferably 22 to 24 percent.

The method can be carried out on a large scale by increasing the number and size of membranes in the electrodialysis apparatus and the diluate and concentrate volumes. Doing so will affect the voltage required to perform the electrodialysis. However, because the method can be defined by parameters, such as diluate concentration, concentrate concentration, power/acid transport ratio, and current efficiency, the optimum values of which are unaffected by the scale of the method, the method remains optimized on any equipment as long as the method is carried out within these parameters.

The present invention is explained in greater detail in the following non-limiting Examples. In the Examples, "A" means amperes, "mA" means milliamperes, "sq cm" means square centimeters, "sq ft" means square feet, and "V" means volts.

EXAMPLE 1

Apparatus and Procedure for Optimization Experiments

A series of experiments designed to determine optimum conditions for separation of acid from hydrolyzate by electrodialysis was performed under the conditions described below. The operating conditions to be optimized were acid concentration of the diluate, acid concentration of the concentrate, sugar concentration in the diluate, current efficiency, membrane area, and power consumption.

Figure 2:
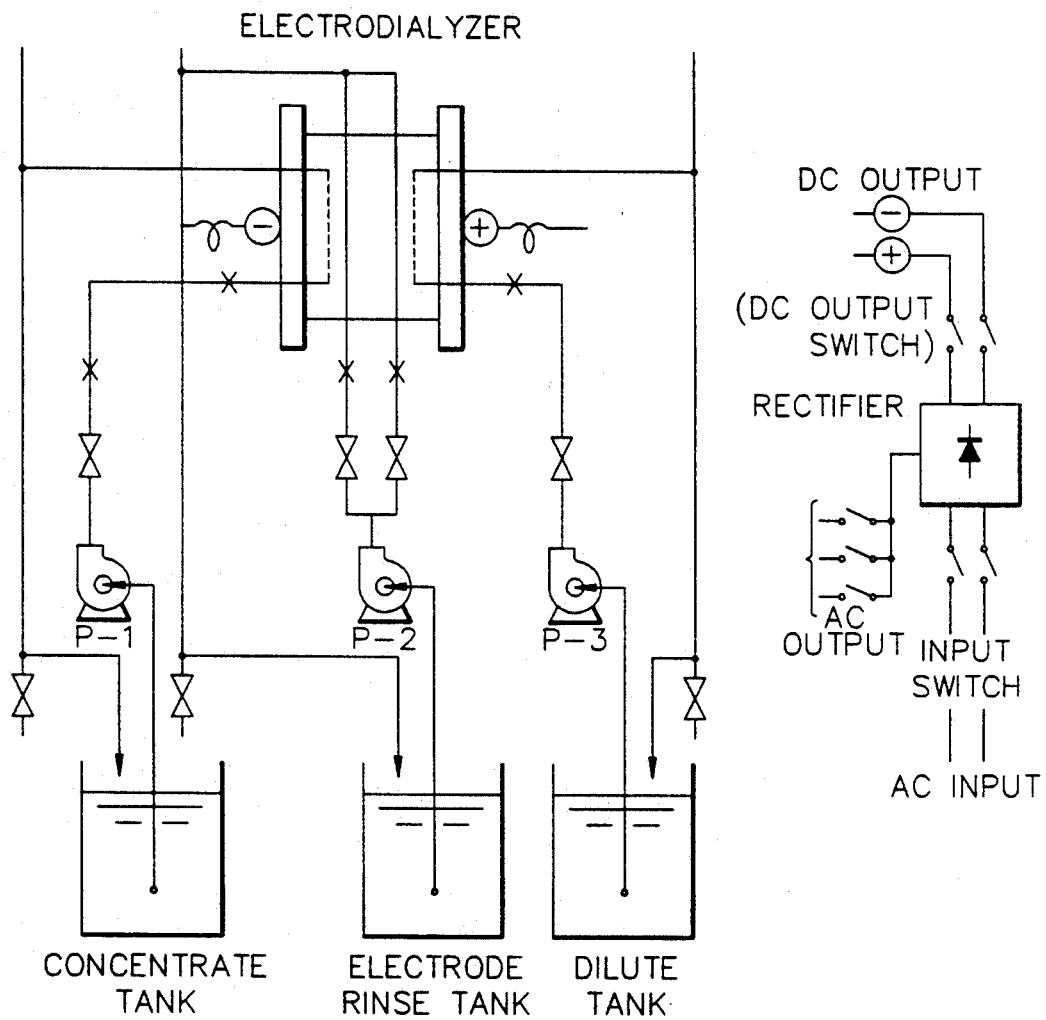
FIG. 2 is a schematic representation of the laboratory apparatus used to conduct experimental trials.

FIG. 2 shows the small scale electrodialysis system used to carry out the experiments. The apparatus contains an electrodialysis unit, holding tanks for diluate and concentrate, and hydraulic equipment to transfer the diluate and concentrate between the tanks and the electrodialysis unit. The electrodialysis unit includes a frame for retaining membrane screens, a cathode on one end of the frame, and an anode on the end of the frame opposite the cathode. The frame holds 10 electrodialysis cells, each of which includes a cathodic and an anodic Asahi Glass type AAV semi-permeable membrane. The cells are arranged such that the membranes are placed adjacent to one another in an alternating cathodic/anodic/cathodic/anodic pattern similar to that of FIG. 1. This configuration establishes 10 alternating diluate and concentrate compartments within the unit. The effective cross-section area of each membrane in the membrane stack is 172 sq cm. Since it contained 10 cells, the total effective membrane area in the stack was 3440 sq cm. A polypropylene diluate holding tank rests outside the electrodialysis unit. Plastic tubing extends from the tank through a pump and flow monitoring valve and into a diluate collecting header, which has entry flow channels leading into the diluate compartments of the electrodialysis unit. Exit flow channels lead from the diluate compartments into an exit collection header, from which plastic tubing extends to the diluate holding tank. The concentrate holding tank is connected to the electrodialysis unit by its own parallel hydraulic circuit, which has its own pump, flow valve, tubing, and headers leading to and from the concentrate compartments of the electrodialysis unit.

The experimental procedure began with the application of sufficient voltage across the cathode and anode to yield the desired 20A current flow through the membrane stack. Voltage varied during electrodialysis as the composition of the solutions changed so that the actual voltage at the power supply was greater than that across the membrane stack itself. Back diffusion of acid caused lower current efficiencies near the end of each experimental run. At the target current of 20A, the current density was 116 mA/sq cm. Prior to voltage application, the diluate holding tank was loaded with a predetermined amount of hydrolyzate. The concentrate holding tank was loaded with a predetermined amount of acid or water. The diluate and concentrate were each continuously pumped into the sugar and acid compartments, respectively, where ion transfer occurred, and each was recovered in its appropriate holding tank until it was pumped through the system again. The recycle flow rate of each liquid was 0.5 gallons/minute.

While in the electrodialysis unit, the acid ions in the hydrolyzate are drawn by the electric current from a diluate compartment into an acid concentrate compartment and subsequently transported to the concentrate holding tank. Water accompanied this acid transport, causing the sugar solution remaining behind in the diluate tank to become more concentrated. Acid solution in the concentrate tank was then pumped into an acid concentrate compartment to collect additional acid from the diluate.

Progress of the separation was monitored by titrating the acid in both reservoirs with standard alkali. Current, voltage, and solution concentrations of both sugar and acid were measured as the electrodialysis proceeded. Sugar concentrations in the solutions were determined by the DNSA method. Specific gravity determinations related the volumetric analyses of the solutions to compositions by weight. In selected cases with high sugar concentrations viscosity measurements were also performed.

In most experiments the electrodialysis was continued until depletion of acid in the diluate tank prevented the maintenance of a 20A current with the voltage available from the power supply. The remaining experiments were stopped when constant acid concentration or constant volume of diluate was achieved.

EXAMPLE 2

Hydrochloric Acid Trials

Description of Experimental Trials

A total of 31 experiments were conducted as described above in Example 1 using hydrochloric acid as the hydrolyzate. These can be sorted into five sets of related procedures.

(1) Diluate and concentrate contained acid but no sugar (Trials 1, 4, 7, 10, 15, and 16).

(2) Diluate contained acid with glucose (3.75 parts sugar to 1 part acid (the approximate ratio resulting from the stripping of HCl before electrodialysis). Initial acid concentrations and volumes of diluate and concentrate were the same. (Trials 2,5,8,17,19,20,21).

(3) Diluate contained acid with glucose as in (2) above except that the volume ratio of initial concentrate to diluate volume was 0.5 instead of 1.0. (Trials 3,6,9,31).

(4) Initial diluate acid concentration of 16% with increasing concentrations of sugar. (Trials 10,11,12,13,14).

(5) Acid with glucose in diluate as in (2) above, but much lower volume of pure water in initial concentrate. (Trials 22,23,24,25,26,27,28,29).

Most of the experiments had similar or equal initial diluate and concentrate acid concentrations in order that the electrodialysis begin at equilibrium and to minimize the effects of diffusion dialysis. However, the conditions in class (5), namely starting with a small volume of pure water in the concentrate tank, were designed to promote increased acceptance of total acid in the concentrate.

Definition of Experimental Terms

Table 1 shows the numerical results of the experimental trials, and FIGS. 3–11 display graphs plotting these results. The table and graphs are labelled with the terms defined below.

Initial and final diluate acid concentrations Acid concentrations were calculated only on the water and acid contents of the solutions; the presence of sugar was ignored.

Sugar transferred. This term represents the weight per cent of the original sugar in the diluate that diffused through the membranes into the concentrate

TABLE 1

HCl ELECTRODIALYSIS DATA

| Run Number | Initial Acid Concns. (%) Dilute (1) | Initial Acid Concns. (%) Concentrate | Initial Conc. Vol/Dil Vol | Dilute Sugar Concns. (%) Initial | Dilute Sugar Concns. (%) Final | Final Acid Concns. (%) Dilute (1) | Final Acid Concns. (%) Concentrate | % of Sugar Transferred | % of Acid Transferred |
|---|---|---|---|---|---|---|---|---|---|
| 1 | 5 | 5 | 0.50 | 0.0 | 0.0 | 0.1 | 9.0 | — | 97.9 |
| 2 | 5 | 5 | 1.00 | 16.3 | 18.4 | 0.8 | 8.3 | 1.1 | 85.1 |
| 3 | 5 | 5 | 0.50 | 16.3 | 18.6 | 0.7 | 10.3 | 0.6 | 85.8 |
| 4 | 9 | 9 | 0.50 | 0.0 | 0.0 | 0.5 | 11.9 | — | 91.1 |
| 5 | 10 | 10 | 1.00 | 28.6 | 35.5 | 2 | 15.0 | 1.7 | 86.9 |
| 6 | 10 | 10 | 0.50 | 28.4 | 39.5 | 1 | 16.5 | 1.8 | 92.1 |
| 7 | 14 | 12 | 0.60 | 0.0 | 0.0 | 4.5 | 16.0 | — | 85.1 |
| 8 | 15 | 15 | 1.00 | 36.8 | 54.9 | 4.2 | 20.7 | 2.3 | 89.8 |
| 9 | 15 | 15 | 0.50 | 38.3 | 61.4 | 4.6 | 20.4 | 1.9 | 86.2 |
| 10 | 16 | 16 | 1.00 | 0.0 | 0.0 | 6.1 | 19.0 | — | 65.1 |
| 11 | 16 | 16 | 1.00 | 16.6 | 31.2 | 1.8 | 17.4 | 3.8 | 91.2 |
| 12 | 16 | 16 | 1.00 | 27.3 | 44.9 | 1.6 | 19.3 | 3.6 | 91.6 |
| 13 | 16 | 16 | 1.00 | 36.4 | 54.5 | 3.2 | 20.0 | 2.4 | 87.0 |
| 14 | 16 | 20 | 1.00 | 34.0 | 55.2 | 2.6 | 19.5 | 1.7 | 93.6 |
| 15 | 18 | 14 | 0.60 | 0.0 | 0.0 | 10 | 18.0 | — | 76.0 |
| 16 | 19.3 | 19.2 | 0.70 | 0.0 | 0.0 | 11.6 | 19.7 | — | 74.5 |
| 17 | 20 | 20 | 1.00 | 44.2 | 68.5 | 8.3 | 23.5 | 1.0 | 83.0 |
| 18 | 20 | 20 | 1.00 | 38.6 (3) | 65.4 | 10.9 | 20.9 | 5.0 | 85.7 |
| 19 | 10 | 10 | 1.00 | 27.0 | 35.5 | 0.9 | 14.3 | 1.0 | 88.8 |
| 20 | 12 | 12 | 1.00 | 31.1 | 42.2 | 1.3 | 15.9 | 1.2 | 90.7 |
| 21 | 14 | 14 | 1.00 | 36.5 | 54.6 | 2.4 | 18.1 | 1.5 | 89.6 |
| 22 | 6 | 0 | 0.08 | 18.9 | 24.8 | 0.7 | 15.2 | 1.5 | 90.4 |
| 23 | 8 | 0 | 0.10 | 23.7 | 30.9 | 1 | 16.9 | 2.1 | 91.4 |
| 24 | 10 | 0 | 0.09 | 27.5 | 37.0 | 1.6 | 18.1 | 1.6 | 89.6 |
| 25 | 12 | 0 | 0.12 | 30.8 | 45.1 | 2.1 | 18.1 | 1.8 | 89.7 |
| 26 | 14 | 0 | 0.16 | 34.7 | 52.0 | 2.3 | 18.1 | 2.0 | 91.2 |
| 27 | 16 | 0 | 0.19 | 40.6 | 59.1 | 3.3 | 18.7 | 1.7 | 91.0 |
| 28 | 18 | 0 | 0.20 | 41.4 | 60.7 | 5 | 19.6 | 1.8 | 87.5 |
| 29 | 20 | 0 | 0.21 | 44.7 | 65.0 | 6.2 | 21.9 | 1.1 | 86.1 |
| 30 | 16 | 0 | 0.19 | 38.6 (3) | 56.5 (3) | 3.1 | 18.7 | 1.4 | 90.3 |
| 31 | 16 | 18 | 0.51 | 39.8 | 64.6 | 5.1 | 20.4 | 2.3 | 85.6 |

| Run Number | Concn. of Acid Transfer. (%) | Δ Final Acid Concns. (%) | Acid Moles Trans./min | Mean Current (Amps) | Voltage Drop Over 10 Cells | Current Eff. Moles/F/Cell | KWHr/lb Acid Transferred | Membrane Area (sq ft)(2) |
|---|---|---|---|---|---|---|---|---|
| 1 | 18.4 | 8.9 | 0.092 | 20 | 10.5 | 0.73 | 0.48 | 53650 |
| 2 | 29.3 | 7.5 | 0.110 | 20 | 10.7 | 0.92 | 0.39 | 42740 |
| 3 | 29.3 | 9.6 | 0.110 | 20 | 9.5 | 0.92 | 0.34 | 42930 |
| 4 | 20.6 | 11.4 | 0.073 | 20 | 9.2 | 0.58 | 0.53 | 68010 |
| 5 | 32.5 | 13.0 | 0.065 | 20 | 8.1 | 0.52 | 0.52 | 76200 |

TABLE 1-continued

| | | | | | | | | |
|---|---|---|---|---|---|---|---|---|
| 6 | 24.7 | 15.5 | 0.069 | 20 | 8.8 | 0.57 | 0.53 | 72050 |
| 7 | 21.3 | 11.5 | 0.066 | 20 | 5.7 | 0.53 | 0.36 | 75300 |
| 8 | 31.2 | 16.5 | 0.074 | 20 | 8.0 | 0.59 | 0.45 | 66970 |
| 9 | 25.0 | 15.8 | 0.055 | 20 | 9.6 | 0.44 | 0.73 | 90500 |
| 10 | 26.5 | 12.9 | 0.059 | 20 | 6.3 | 0.48 | 0.44 | 83460 |
| 11 | 26.3 | 15.6 | 0.060 | 20 | 6.7 | 0.48 | 0.47 | 82620 |
| 12 | 26.0 | 17.7 | 0.062 | 20 | 8.2 | 0.50 | 0.55 | 79950 |
| 13 | 27.1 | 16.8 | 0.062 | 20 | 8.8 | 0.50 | 0.59 | 79060 |
| 14 | 24.9 | 16.9 | 0.061 | 20 | 8.6 | 0.49 | 0.59 | 81790 |
| 15 | 24.1 | 8.0 | 0.074 | 20 | 6.3 | 0.60 | 0.35 | 66810 |
| 16 | 25.1 | 8.1 | 0.065 | 20 | 6.3 | 0.51 | 0.41 | 76510 |
| 17 | 37.4 | 15.2 | 0.058 | 20 | 10.1 | 0.47 | 0.72 | 84710 |
| 18 | 25.7 | 10.0 | 0.063 | 20 | 8.3 | 0.50 | 0.55 | 78620 |
| 19 | 28.6 | 12.9 | 0.077 | 20 | 9.3 | 0.61 | 0.50 | 64100 |
| 20 | 30.1 | 14.6 | 0.070 | 20 | 9.6 | 0.56 | 0.57 | 70890 |
| 21 | 27.1 | 15.7 | 0.062 | 20 | 9.2 | 0.50 | 0.61 | 79280 |
| 22 | 25.2 | 14.5 | 0.069 | 20 | 8.3 | 0.56 | 0.50 | 71440 |
| 23 | 22.5 | 15.9 | 0.068 | 20 | 8.2 | 0.55 | 0.50 | 72610 |
| 24 | 23.8 | 16.5 | 0.064 | 19.94 | 8.8 | 0.52 | 0.57 | 77300 |
| 25 | 25.1 | 16.0 | 0.063 | 20 | 9.0 | 0.50 | 0.59 | 78170 |
| 26 | 26.5 | 15.8 | 0.069 | 19.74 | 9.9 | 0.56 | 0.59 | 71540 |
| 27 | 32.0 | 15.4 | 0.074 | 19.57 | 10.0 | 0.60 | 0.55 | 67150 |
| 28 | 31.0 | 14.6 | 0.067 | 19.2 | 11.1 | 0.56 | 0.66 | 73730 |
| 29 | 33.4 | 15.7 | 0.067 | 18.74 | 10.7 | 0.58 | 0.62 | 73350 |
| 30 | 30.2 | 15.6 | 0.072 | 20 | 9.1 | 0.58 | 0.53 | 68750 |
| 31 | 27.2 | 15.3 | 0.057 | 20 | 9.0 | 0.46 | 0.66 | 86910 |

(1) HCl in water only
(2) For 50 tons/day HCl transfer Assuming 65% effective area
(3) Maltose, all others glucose during the electrodialysis. It is apparent that glucose is effectively retained, and the higher molecular weight oligomers found in more typical industrial hydrolyzates should be retained even more effectively.

Acid transferred. This term represents the weight percent of the original acid in the diluate that was transported through the membranes into the concentrate during the electrodialysis.

Concentration of acid transferred. This calculation represents the concentration of the acid transferred from diluate to concentrate and is based on the number of acid moles transferred and the total volume of diluate transferred.

Delta final acid concentrations. This term is the difference between the final acid concentrations in the diluate and concentrate. Back diffusion of acid under osmotic pressure reduces this differential in the absence of sugar, and limits it even when sugar is present.

Acid moles transferred per minute. This is the total number of moles transferred divided by the duration of electrodialysis. Acid transport depends on current and membrane area (current density), as well as current efficiency (as defined below). Since membrane area and current are fixed in these experiments, the reported values are proportional to current efficiency.

Current. The experiments were performed at a constant current when possible. For some of the runs using water alone as the initial concentrate solution, there was a brief initial period during which the current was less than 20A; this period lasted until the diffusion of ions could sustain sufficient current. The delay in full current realization slightly reduced the average current value to just below 20A.

Voltage drop over 10 cells. Voltage readings were taken at the power supply and across the 10 cells in the electrodialysis stack. Sufficient voltage was applied to the membrane stacks for 20A to flow. The power supply values were 4–5 volts higher. In general the required voltage across the membrane stack rapidly decreased to a uniform level after start-up, remained at this uniform level for most of the procedure, then rapidly increased near the end by the procedure to the point that the desired current could no longer be maintained. The reported values are the average over the duration of the experiment, and are only slightly higher than the uniform value observed through most of the procedure.

Current efficiency. Current efficiency is defined as the number of moles of acid transported per Faraday (96,500 coulombs) of electricity passed per cell. The theoretical value for the monovalent chloride ion is 1. The reported values represent the average over the duration of the experiment. Current efficiency is affected by acid and sugar concentration; accordingly, the values fluctuated dramatically during the experiments. Diffusion of acid from high diluate to low concentrate concentrations contributes to high apparent current efficiencies, while back diffusion of acid from high concentrate to low diluate concentrations contributes to low apparent current efficiencies. As an extreme example, in Trial 24 the initial current efficiency was inflated to a value of 1.14 by free diffusion dialysis of acid into water in the concentrate tank. At the end of the experiment it had fallen to 0.26 due to the back diffusion of acid to the depleted diluate tank. The cumulative or average value was 0.52.

KWHr/lb HCl. This term represents power expended in transport and is calculated by dividing the power (calculated as the product of voltage, current, and time) by the weight of acid transported. It is sensitive to both current efficiency and voltage.

Membrane area. The membrane areas reported have been calculated by extrapolating from the acid moles transported per minute in the experimental stack to the area needed to transport 50 tons/day of HCl at the same efficiency. These are total areas based on assumed 65 percent effective area for commercial installations. 50 tons/day of HCl transport was selected because this quantity of acid corresponds to 90 percent of the acid residue resulting from a stripping operation which removes 75 percent of the HCl from a hydrolyzate containing 2 parts 45 percent HCl to 1 part cellulosic waste, assuming 250 tons/day of cellulosic waste.

Results of Experimental Trials

Figure 3:
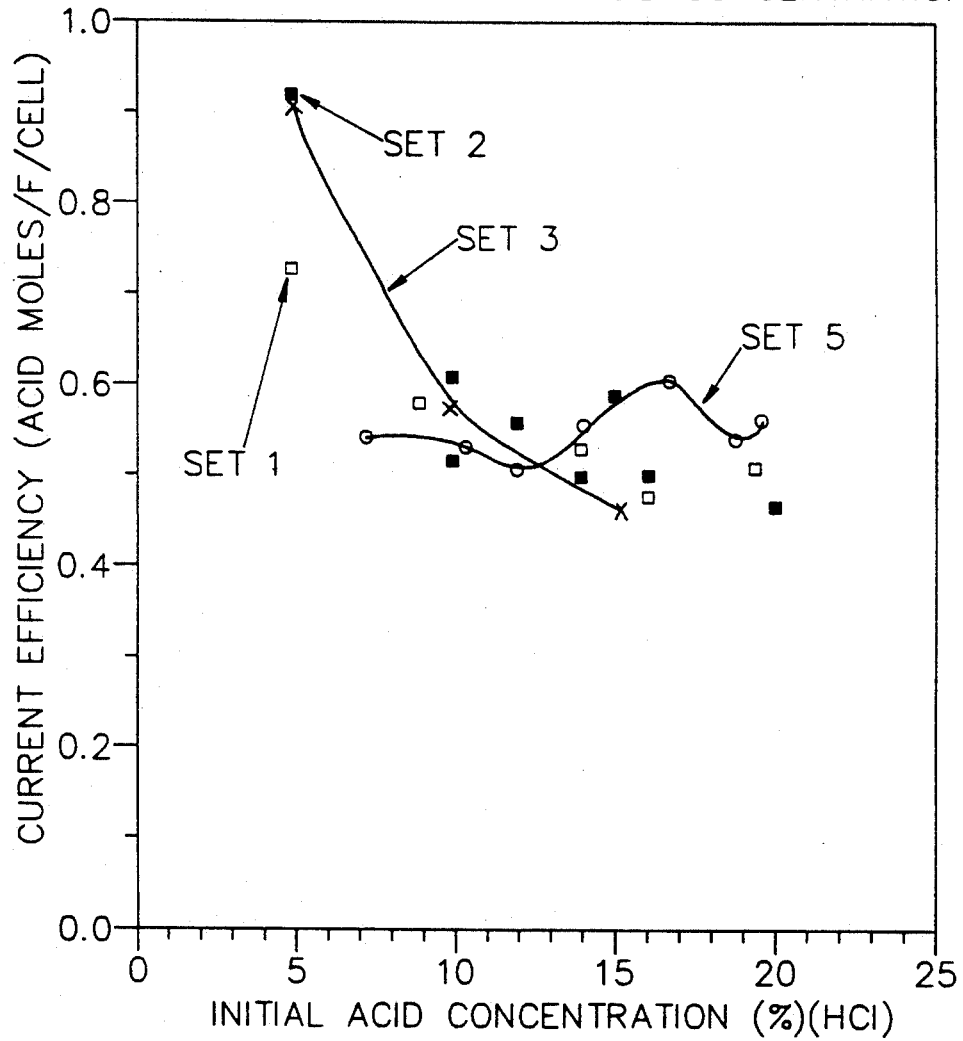
FIG. 3 is a graph plotting current efficiency versus initial diluate acid concentration for HCl.

Current Efficiency. Current efficiency is an important factor in electrodialysis, since it influences not only the original capital investment because of membrane area requirements, but also the power consumption per unit of acid recycled. The general trend throughout the experimental runs, as seen in FIG. 3, is a decrease in current efficiency with increasing initial acid concentration. This trend held regardless of the initial acid concentration and volume of the concentrate. There appears to be a slight increase in overall current efficiency in the presence of sugar. Also noteworthy is an increase in current efficiency at 15 percent acid with sugar present. This increase was confirmed in later experiments.

Figure 4:
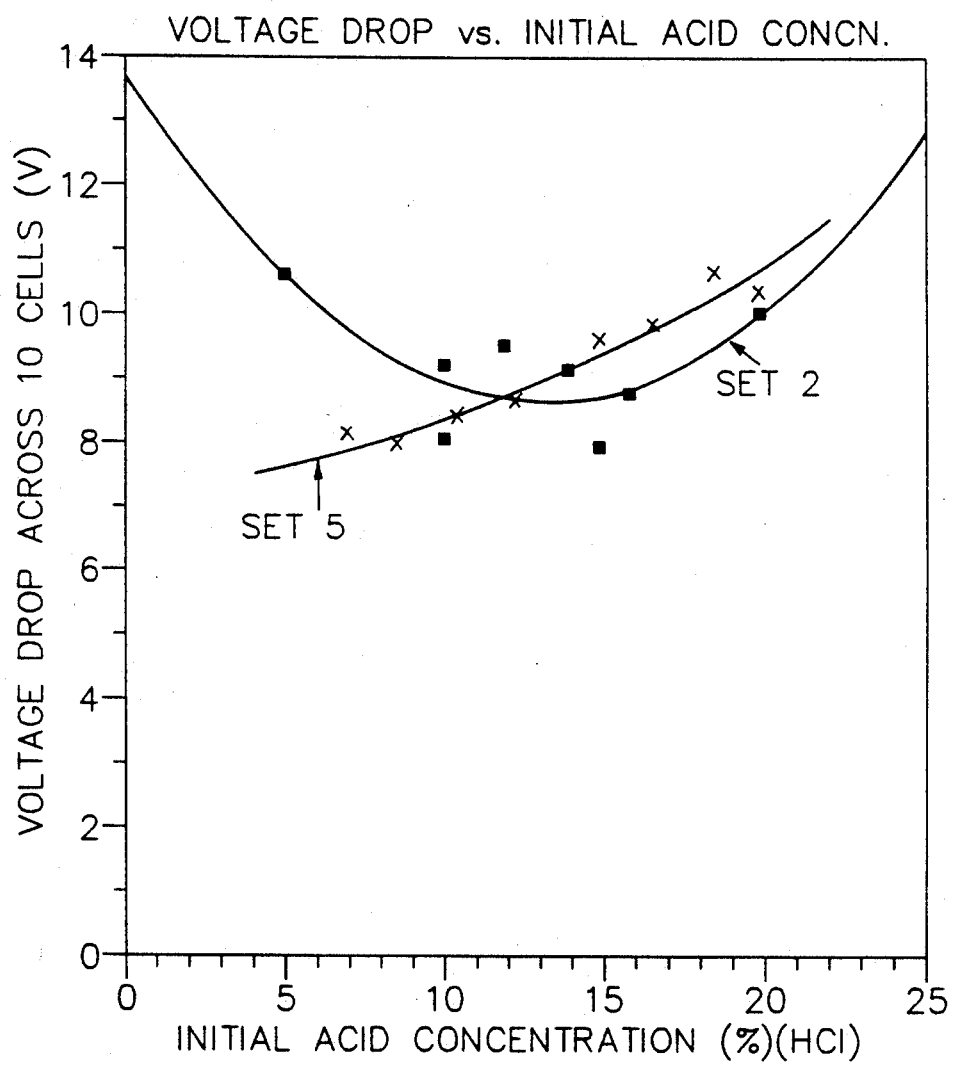
FIG. 4 is a graph plotting required voltage versus initial diluate acid concentration for HCl.
Figure 5:
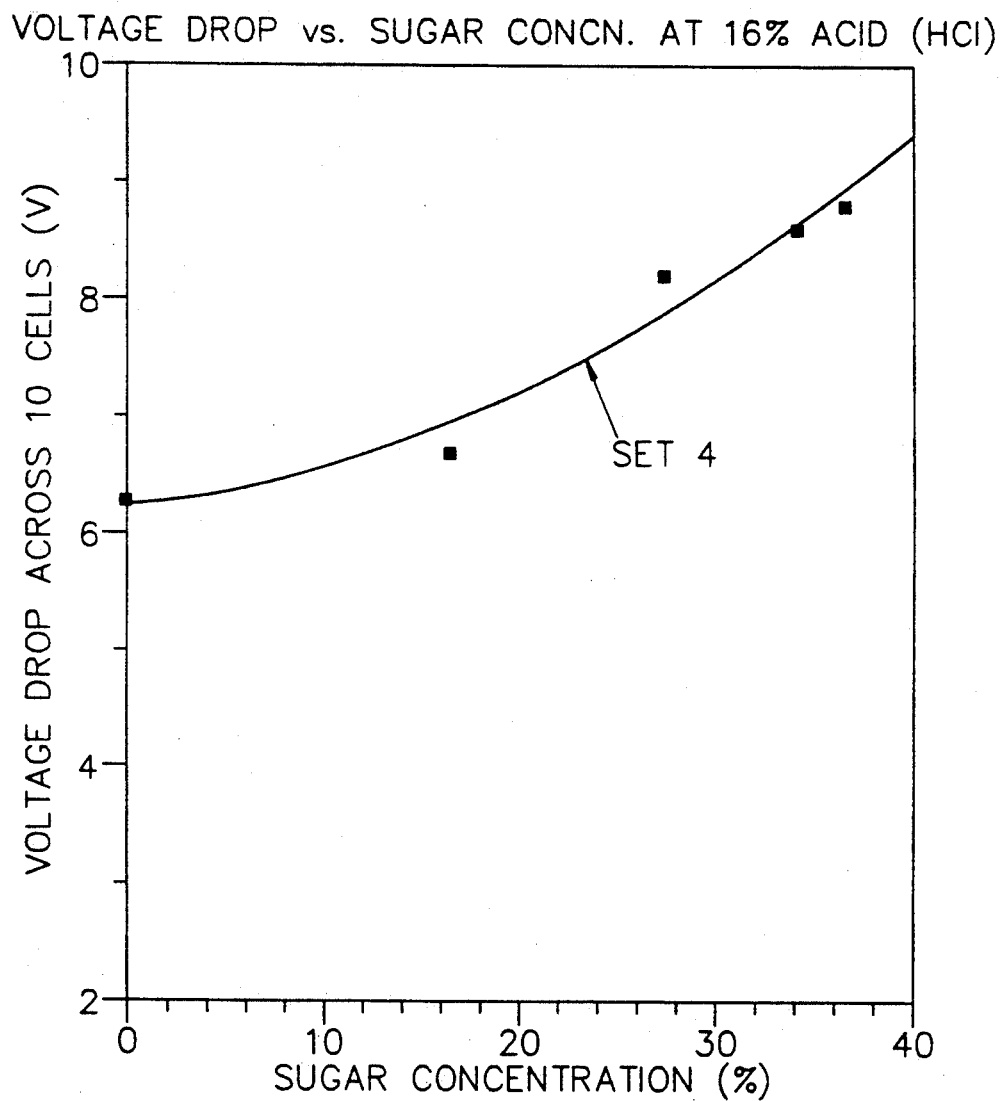
FIG. 5 is a graph plotting required voltage versus diluate sugar concentration at 16 percent initial diluate HCl concentration.

Voltage. The voltage required to maintain a 20A current across the cells is also an important factor because it affects power consumption during operation of the electrodialysis unit. As shown by FIG. 4, the general trend is an increase in required voltage for increasing initial acid concentration. However, there exists a distinct minimum in the voltage curve at approximately 15 percent initial acid concentration with sugar present. FIG. 5 shows that at 16 percent acid concentration voltage increases with sugar concentration.

Acid Transport. Inasmuch as acid recovery is the objective of the electrodialysis, various aspects of acid transport are of interest. These include the final concentration of the concentrate solution, the percentage of acid recovered, and the concentration of transferred acid.

Figure 6:
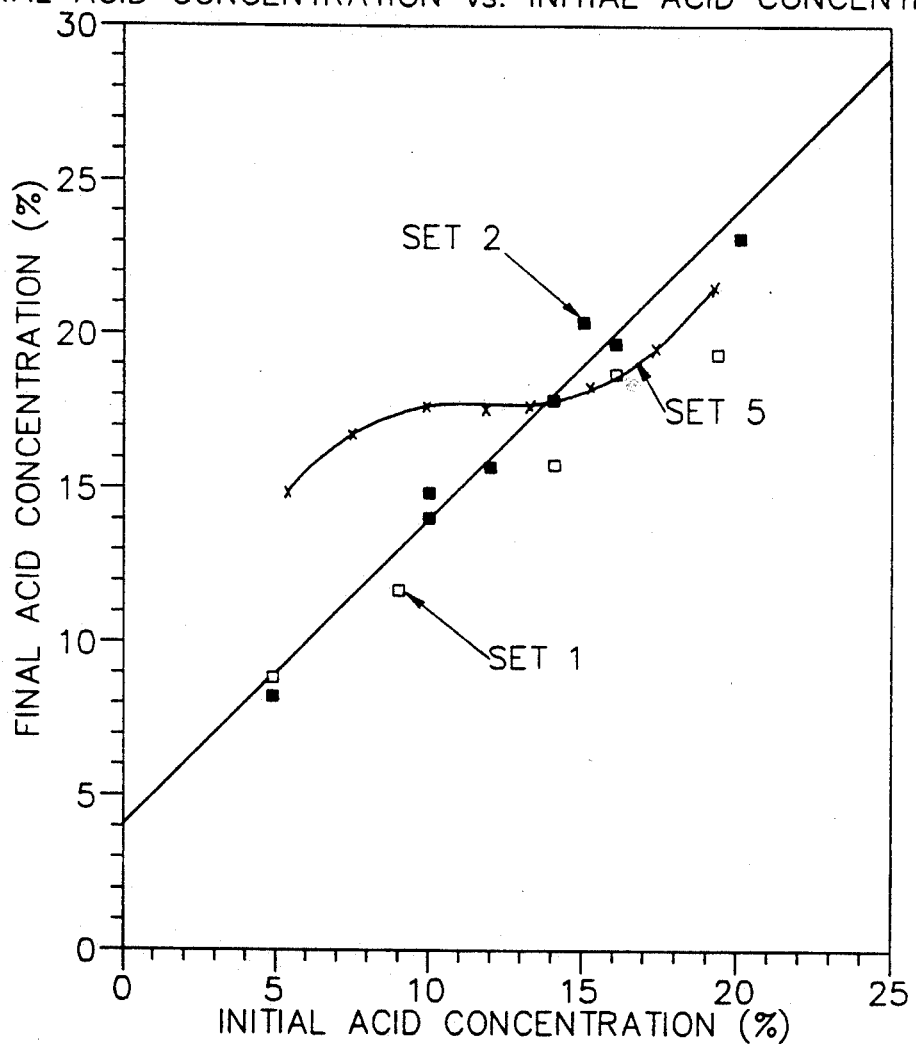
FIG. 6 is a graph plotting final concentrate acid concentration versus initial diluate HCl concentration.

FIG. 6 shows that final acid concentrate concentrations generally rise with higher initial diluate and concentrate acid concentrations Final concentrate concentrations also rise when sugar is present in the diluate.

In an effort to increase the final acid concentration significantly above 20 percent, 16 percent initial acid in the diluate tank was transported into half its volume of 18 percent acid in the concentrate tank (Trial 31). The final concentration was 20.4 percent, and the low current efficiency signified that back diffusion of acid rather than further concentration had occurred as electrodialysis continued.

Figure 7:
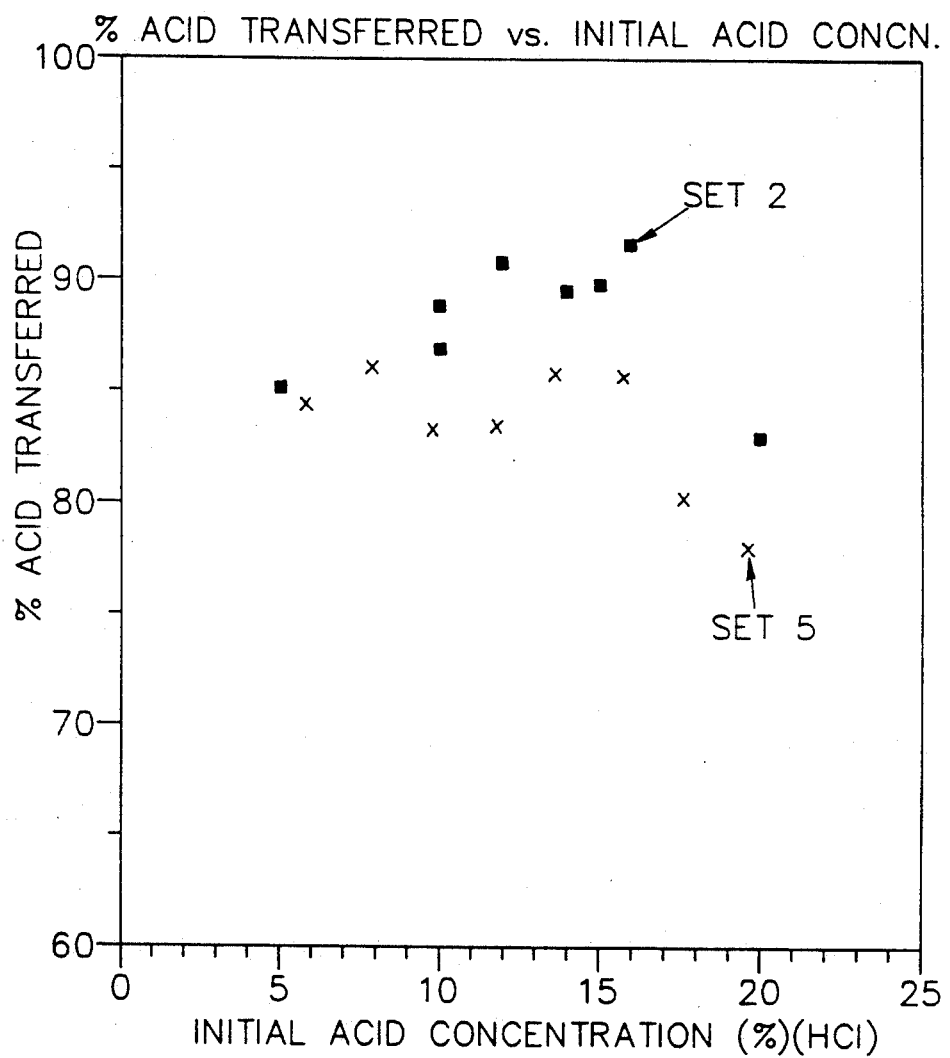
FIG. 7 is a graph plotting the percentage of diluate acid transferred versus initial diluate concentration for HCl.

FIG. 7 shows the percentage of acid transferred from diluate to concentrate as a function of initial diluate concentration. At initial acid concentrations greater than 15-16 percent the amount of acid transported fell below 90 percent. In the absence of sugar the amount of acid transported was also reduced.

Figure 8:
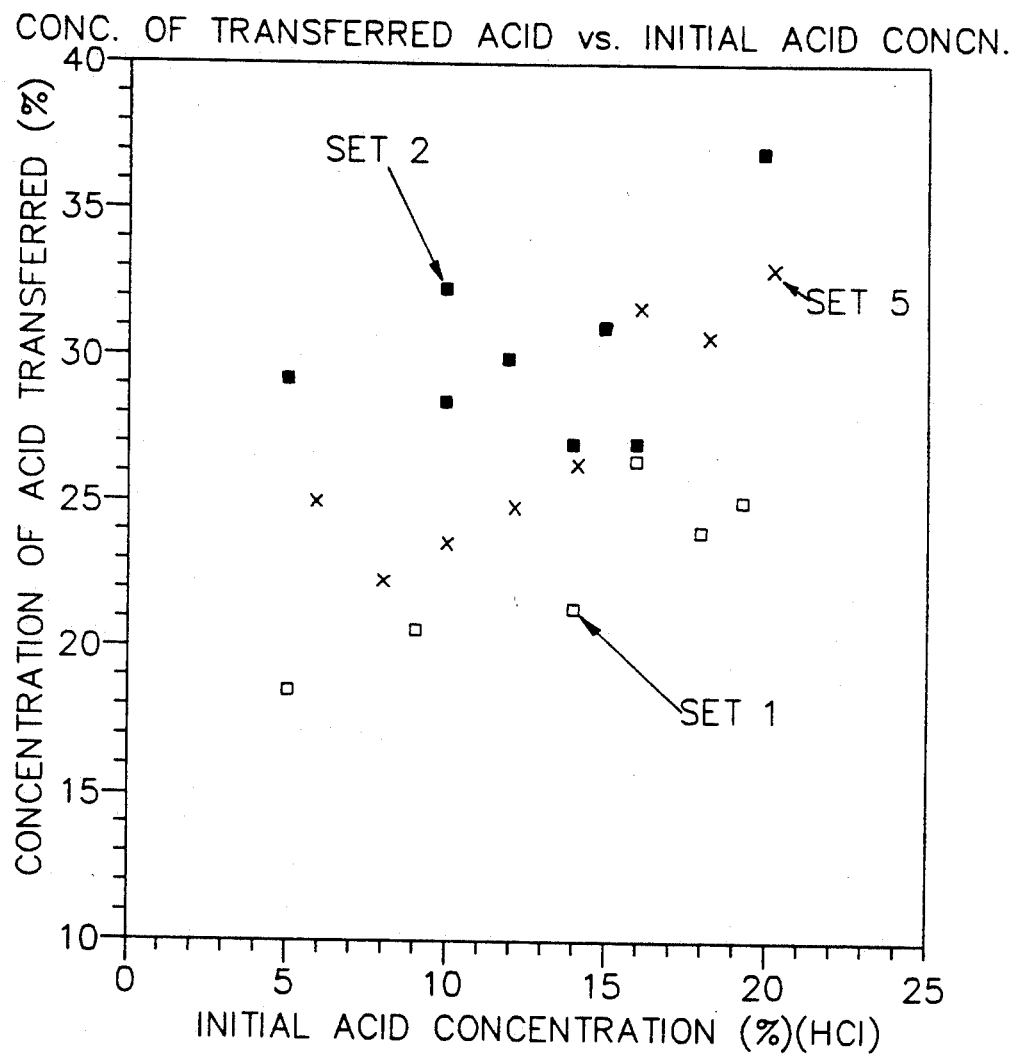
FIG. 8 is a graph plotting concentration of acid transferred versus initial diluate HCl concentration.

As shown by FIG. 8, the presence of sugar in the diluate results in much higher concentrations of the acid transferred. Further, the concentration of acid transferred increased with initial acid concentration when water alone was used as the initial concentrate.

Power Consumption and Membrane Area. These parameters are the ultimate economic determinants of capital costs (membrane area) and operating costs (power consumption) for electrodialysis.

Figure 9:
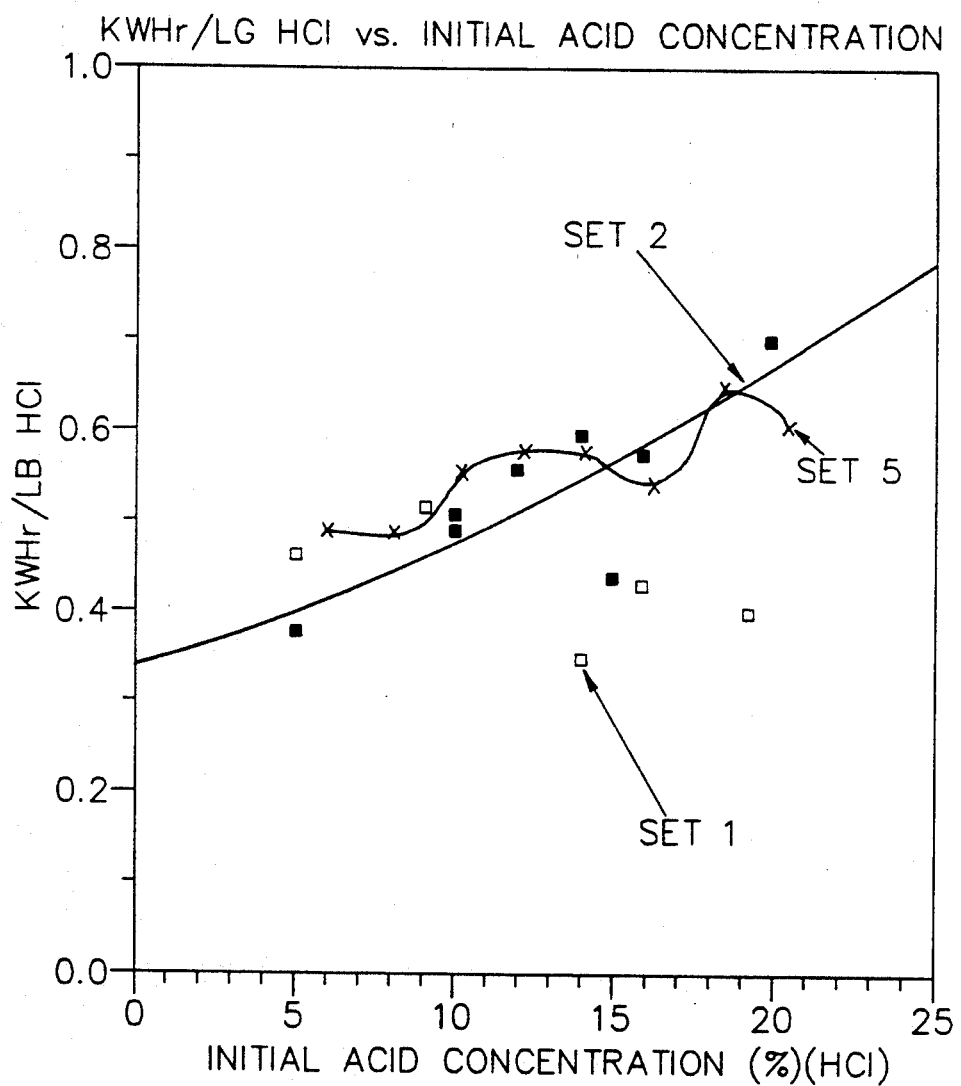
FIG. 9 is a graph plotting the power/acid transport ratio and the required membrane area versus initial diluate HCl concentration.

FIG. 9 illustrates that, in the absence of sugar, the power consumption appears to increase slightly with increasing acid concentration. (Recall, however, because the sugar to acid ratio was constant, sugar concentrations were also increasing.) In contrast to the general trend, power consumption dipped at about 15 percent initial acid concentration.

Figure 10:
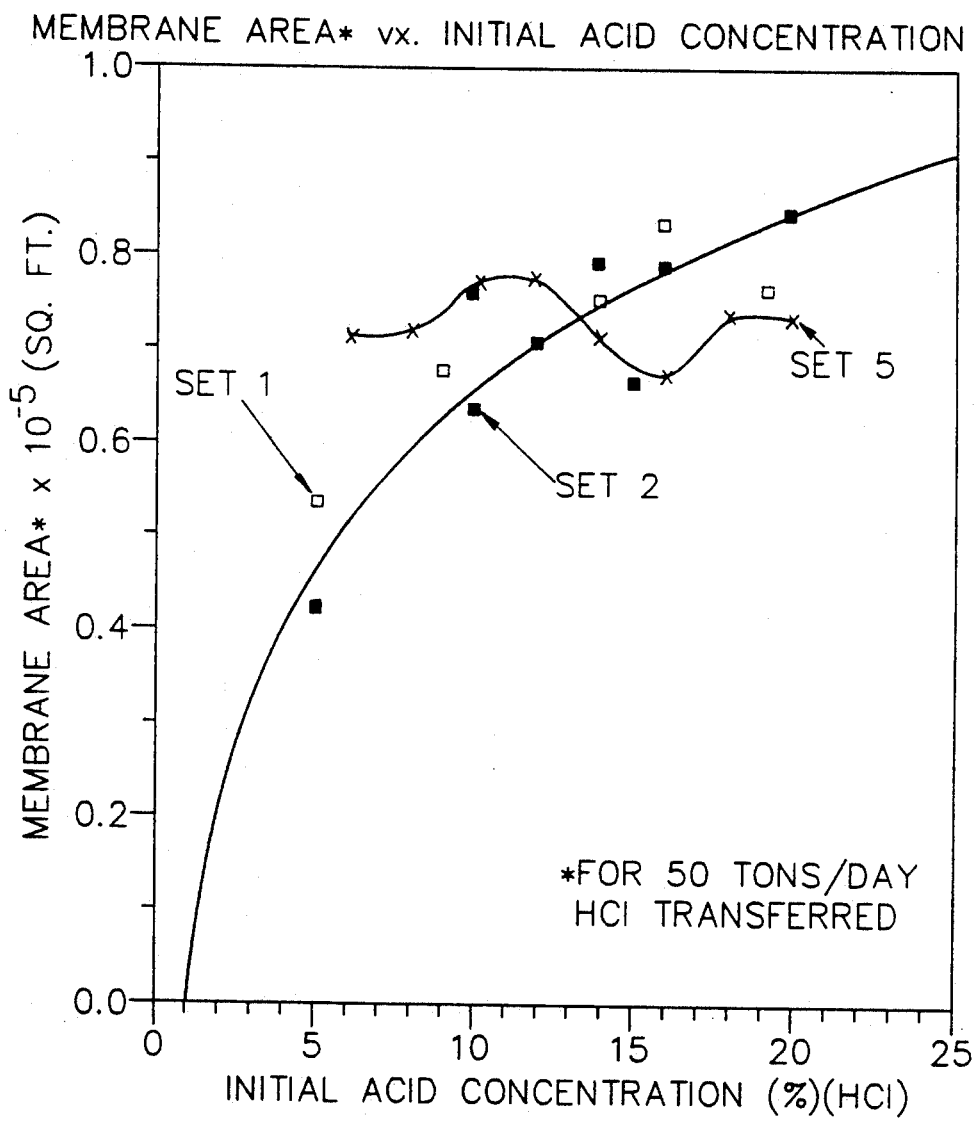
FIG. 10 is a graph plotting the required membrane area versus initial diluate HCl concentration.

For membrane area requirements, FIG. 10 shows the general trend to be, as expected from the decreasing current efficiency, an increase in membrane area with acid concentration. This trend was seen in all classes of experiments. However, all trials showed a decrease in required membrane area at 15-16 percent initial diluate acid concentration.

Figure 11:
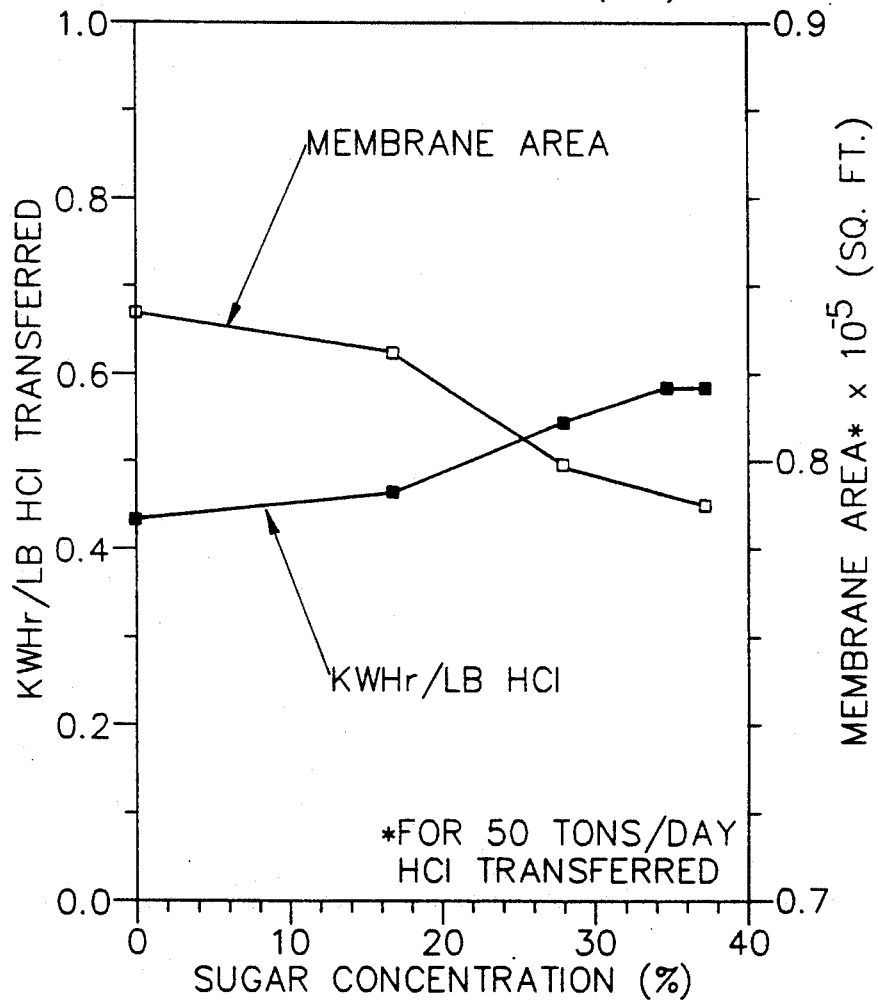
FIG. 11 is a graph plotting power/acid transport ratio and membrane area versus diluate sugar concentration at 16 percent initial diluate HCl concentration.

FIG. 11 shows that, at a constant acid concentration of 16 percent, required membrane area decreases and power consumption increases with increasing sugar content.

Setting reasonable values for percentage of acid transferred of 90 percent and final acid concentration of approximately about 20 percent permits the realization of a power consumption of about 0.50 KWhr/lb HCl transferred, current efficiency of about 0.60 Moles/F-/Cell, and membrane area for transport of 50 tons/day HCl of about 67,000 sq ft at an initial acid concentration in the diluate of 15-16 percent in the presence of sugar.

Optimum Current Density. Current density is defined as the current per unit of effective area of the membrane through which the current passes. The experiments reported above were conducted at a current density of 116 mA/sq cm (20 amperes through 172 sq cm). The higher the applied current density the lower will be the membrane area required to achieve a specified degree of ion transfer, and, therefore the lower will be the capital and membrane replacement costs. On the other hand power costs will be higher. For each system there is an optimum current density which is the value at which the sum of the membrane cost, which decreases with increasing current density, and the power cost, which increases with current density, is a minimum.

EXAMPLE 3

Sulfuric Acid Experimental Trials

Description of Experimental Trials

Experimental set-up and procedure were as described in Example 1. The data for the electrodialysis of sulfuric acid solutions are shown in Table 2 and in FIGS. 12-18. The table headings are the same as those described above in Example 2 for HCl, with the exception that the membrane areas are those needed to transport 300 tons/day of sulfuric acid, since all the non-volatile acid must be recovered by electrodialysis. This quantity of acid corresponds to recovery of 90 percent of the acid from a hydrolyzate resulting from hydrolysis of a solution containing a 2:1 ratio of 68 percent sulfuric acid to 250 tons/day of cellulosic waste.

The 11 experimental trials catalogued in Table 2 can be sorted into two sets:

(1) Diluate contained acid alone without sugar. The ratio of initial concentrate solution volume to diluate volume was 0.5 at the same concentration. (Trials 1-7).

(2) Diluate contained acid with glucose. The glucose to acid ratio was 1:1, and the initial concentrate was pure water at about 0.1 of the volume of the diluate solution. (Trials 8-11).

Results of Experimental Trials

Figure 12:
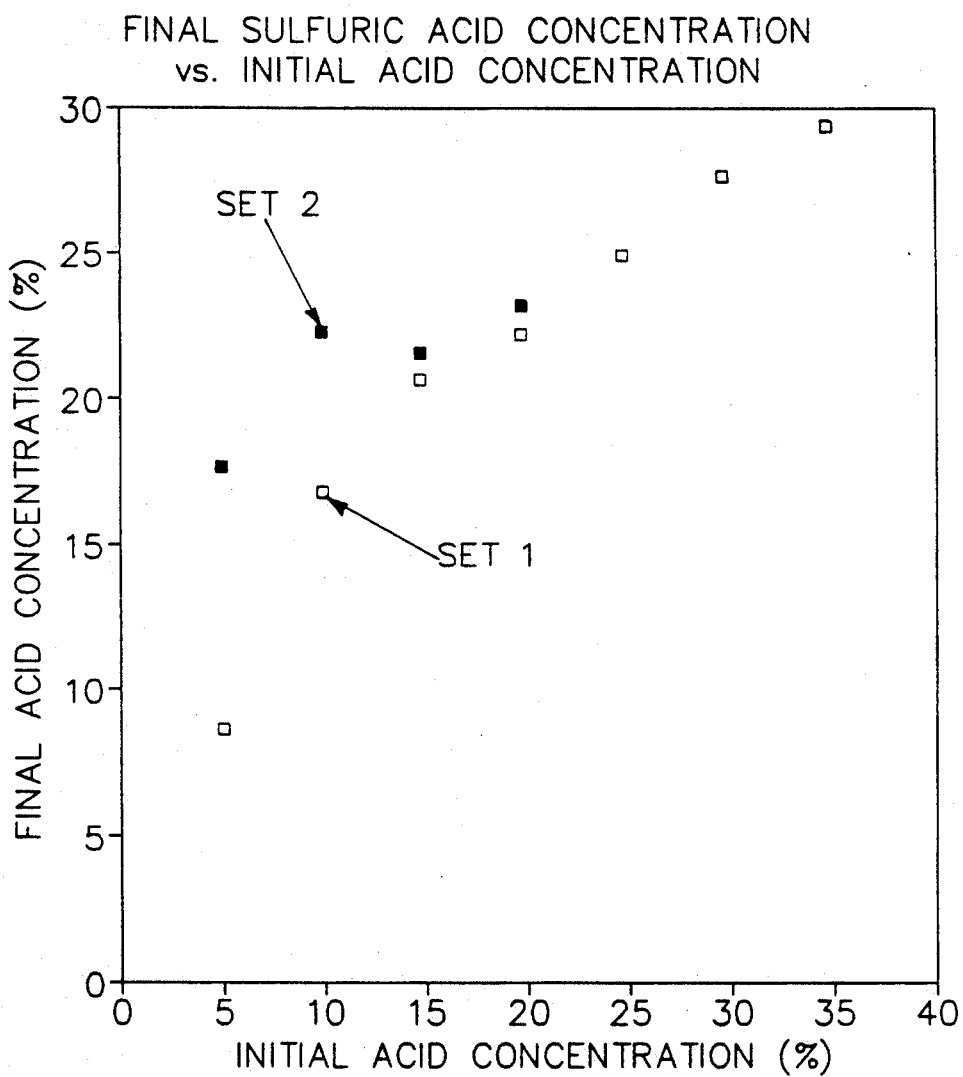
FIG. 12 is a graph plotting final concentrate sulfuric acid concentration versus initial diluate sulfuric acid concentration.

Acid Transport. As shown in FIG. 12, the final concentrate acid concentration without sugar increased with increasing initial acid concentration. However, while the final acid concentrations exceeded the initial at initial concentration values up to 20 percent, they were equal at 25 percent and lower than initial at higher initial values. In the presence of sugar the final acid

TABLE 2

SULFURIC ACID ELECTRODIALYSIS DATA

| Run Number | Initial Acid Concns. (%) Dilute (1) | Initial Acid Concns. (%) Concentrate | Initial Conc. Vol/Dil Vol | Dilute Sugar Concns. (%) Initial | Dilute Sugar Concns. (%) Final | Final Acid Concns. (%) Dilute (1) | Final Acid Concns. (%) Concentrate | % of Sugar Transferred | % of Acid Transferred |
|---|---|---|---|---|---|---|---|---|---|
| 1 | 5 | 5 | 0.5 | 0.0 | 0.0 | 0.4 | 8.7 | — | 91.6 |
| 2 | 10 | 10 | 0.5 | 0.0 | 0.0 | 0.6 | 16.8 | — | 93.5 |
| 3 | 15 | 15 | 0.5 | 0.0 | 0.0 | 0.6 | 20.6 | — | 96.3 |
| 4 | 20 | 20 | 0.5 | 0.0 | 0.0 | 6.1 | 22.1 | — | 84.7 |
| 5 | 25 | 25 | 0.5 | 0.0 | 0.0 | 15.5 | 24.7 | — | 72.2 |
| 6 | 30 | 30 | 0.5 | 0.0 | 0.0 | 25.0 | 27.5 | — | 47.9 |
| 7 | 35 | 35 | 0.5 | 0.0 | 0.0 | 29.2 | 29.2 | — | 49.1 |
| 8 | 5 | 0 | 0.1 | 5.1 | 5.8 | 0.8 | 17.7 | 1.4 | 83.4 |
| 9 | 10 | 0 | 0.09 | 9.3 | 12.7 | 0.9 | 22.2 | 3.3 | 93.3 |
| 10 | 15 | 0 | 0.09 | 13.2 | 22.9 | 1.0 | 21.5 | 5.3 | 95.3 |
| 11 | 20 | 0 | 0.09 | 17.1 | 34.7 | 1.6 | 23.1 | 6.6 | 97.6 |

| Run Number | Concn. of Acid Transfer. (%) | Δ Final Acid Concns. (%) | Acid Moles Trans./min | Mean Current (Amps) | Voltage Drop Over 10 Cells | Current Eff. Moles/F/Cell | KWHr/lb Acid Transferred | Membrane Area (2) |
|---|---|---|---|---|---|---|---|---|
| 1 | 40.6 | 8.3 | 0.033 | 18.29 | 14.9 | 0.29 | 0.63 | 333 |
| 2 | 28.2 | 16.2 | 0.030 | 19.94 | 11.5 | 0.24 | 0.60 | 367 |
| 3 | 27.5 | 20.0 | 0.025 | 20 | 10.3 | 0.20 | 0.63 | 440 |
| 4 | 28.0 | 16.0 | 0.023 | 20 | 8.9 | 0.18 | 0.61 | 478 |
| 5 | 29.5 | 9.2 | 0.021 | 20 | 7.8 | 0.17 | 0.56 | 524 |
| 6 | 36.0 | 2.5 | 0.016 | 20 | 7.9 | 0.13 | 0.76 | 687 |
| 7 | 44.0 | 0.0 | 0.017 | 20 | 8.2 | 0.14 | 0.75 | 647 |
| 8 | 31.5 | 16.9 | 0.027 | 18.02 | 13.6 | 0.25 | 0.69 | 407 |
| 9 | 30.0 | 21.3 | 0.026 | 18.07 | 11.0 | 0.23 | 0.59 | 422 |
| 10 | 29.4 | 20.5 | 0.022 | 19.28 | 9.8 | 0.19 | 0.65 | 499 |
| 11 | 31.3 | 21.5 | 0.021 | 19.55 | 8.9 | 0.18 | 0.63 | 523 |

(1) Sulfuric Acid in Water Only
(2) Thousands of sq ft for Transfer of 300 Tons/Day Sulfuric Acid Assuming 65% Effective Area concentration was much higher than without sugar at 5 and 10 percent, and slightly higher at 20 percent.

Figure 13:
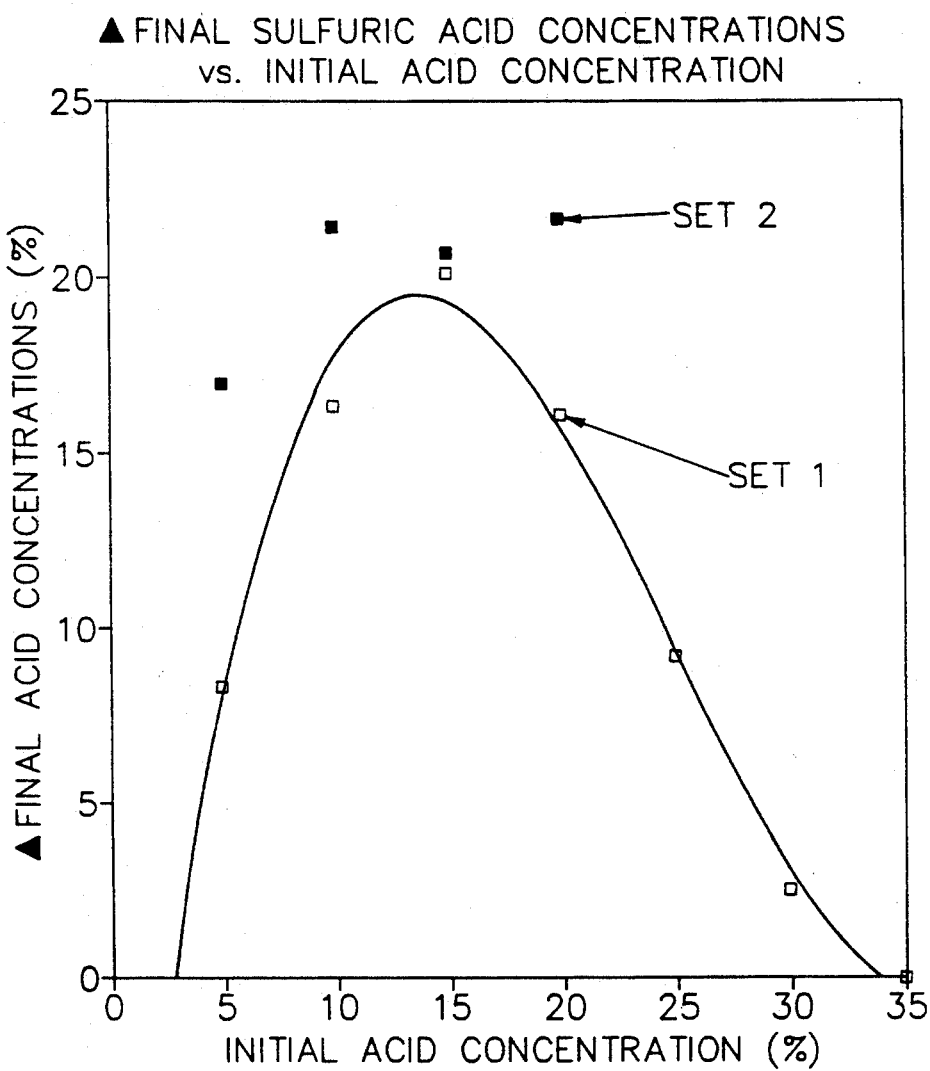
FIG. 13 is a graph plotting the difference in final concentrate and initial diluate sulfuric acid concentration.

FIG. 13 shows a maximum final acid concentration differential of 20 percent at 15 percent initial acid without sugar. At higher initial acid concentrations the differential falls off rapidly. In the presence of sugar the maximum value of just over 20 percent was attained at 10 percent initial acid, and was still at that value at 20 percent initial acid.

Figure 14:
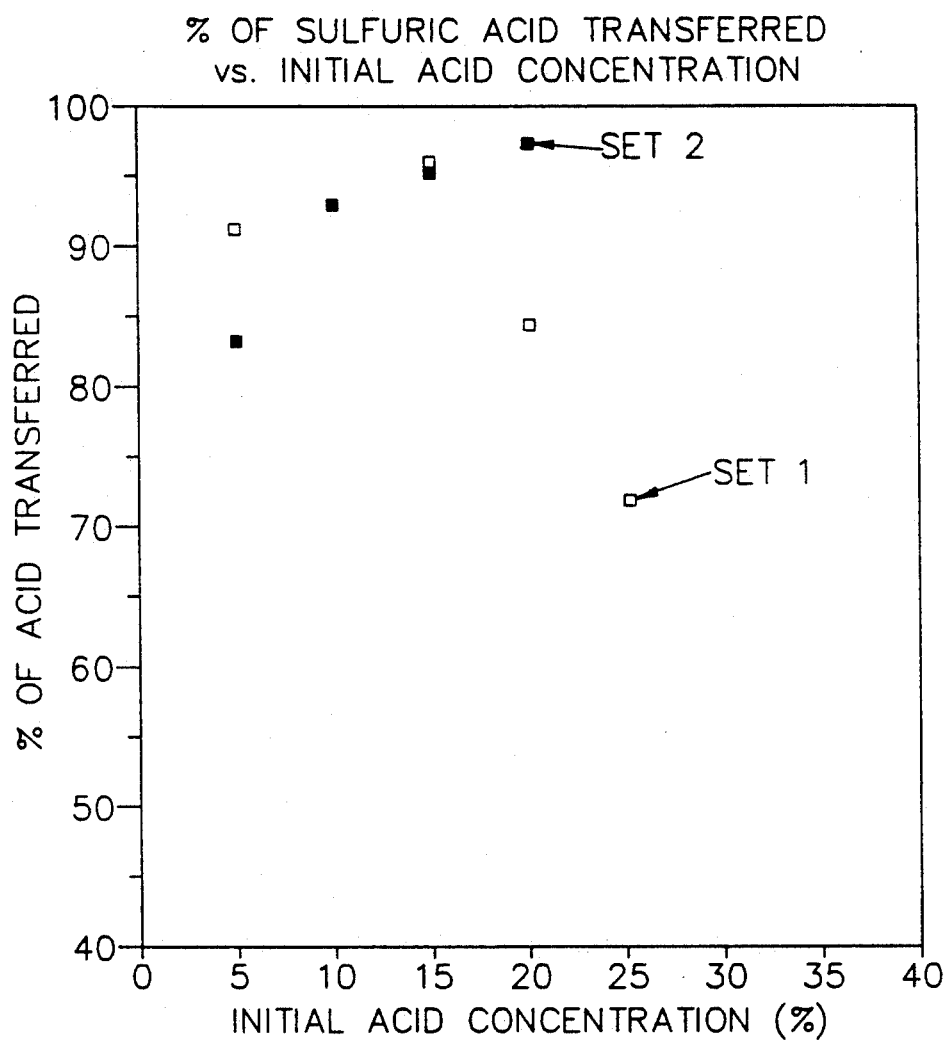
FIG. 14 is a graph plotting the percentage of sulfuric acid transferred versus initial diluate sulfuric acid concentration.
Figure 15:
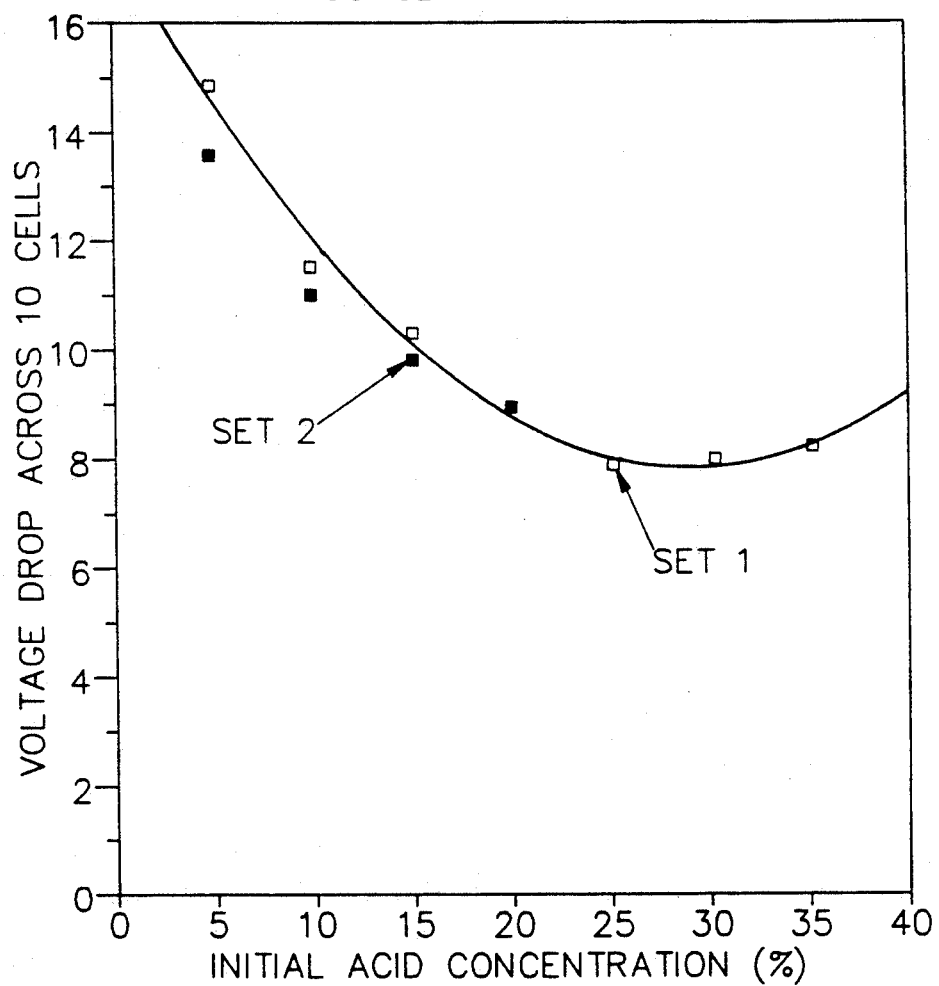
FIG. 15 is a graph plotting the required voltage versus diluate initial sulfuric acid concentration.

Without sugar the percentage of acid transferred reached a maximum of 96 percent at 15 percent initial diluate acid and then fell off sharply, as shown in FIG. 14. In the presence of sugar the percentage of acid transferred had increased to 98 percent at 20 percent initial acid. Voltage. Dilute sulfuric acid solutions had higher voltage drops across 10 cells than did the HCl solutions. The minimum value of about 8 V occurred at approximately 25 percent initial acid as shown in FIG. 15. In the presence of sugar the voltage values were slightly lower, but followed the same trend.

Figure 16:
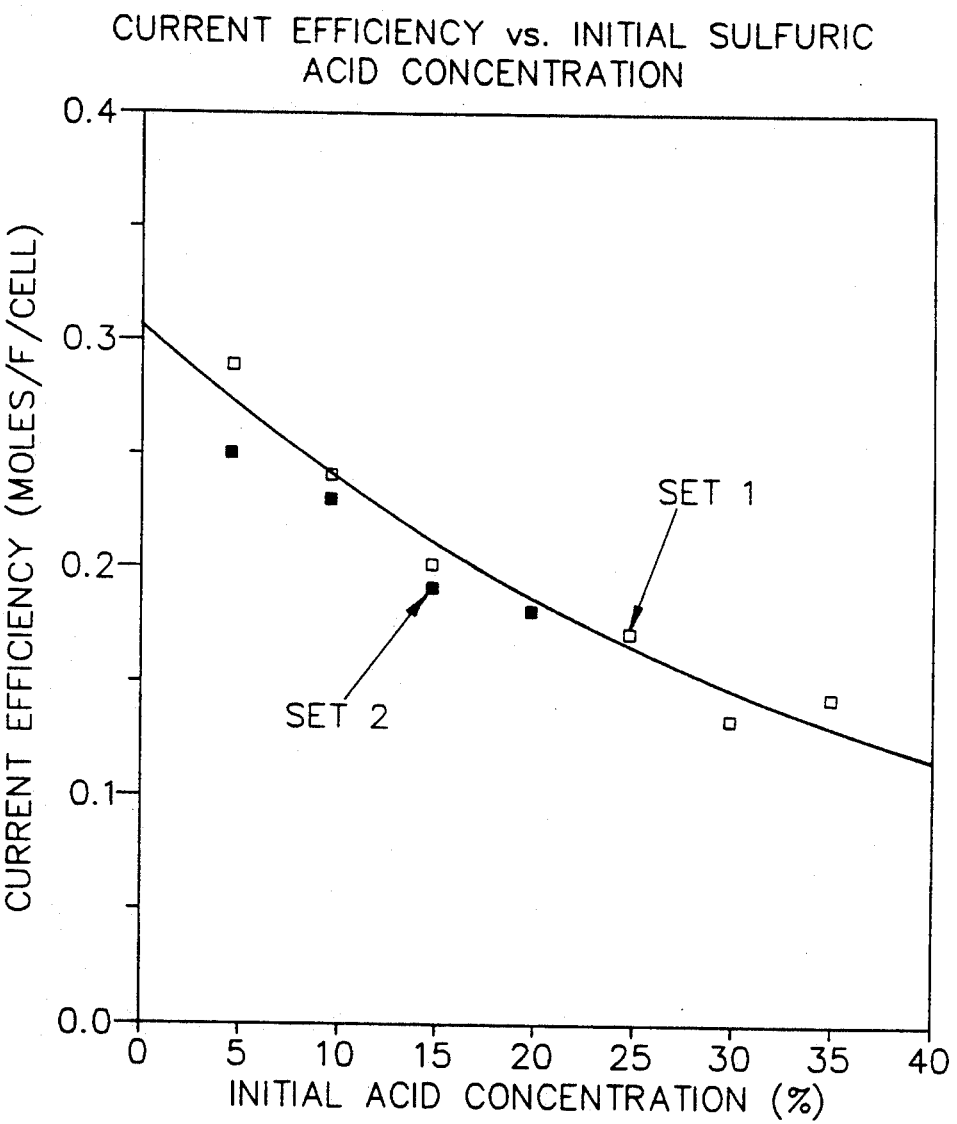
FIG. 16 is a graph plotting current efficiency versus initial diluate sulfuric acid concentration.

Current Efficiency. The molar current efficiency for sulfuric acid transport was much lower than that for HCl, principally because the sulfate ion is divalent. However, even when compared on an equivalent rather than a molar basis the sulfuric acid values were still lower. FIG. 16 shows the continual decline in current efficiency with acid concentration, and the slightly lower but parallel values in the presence of sugar.

Figure 17:
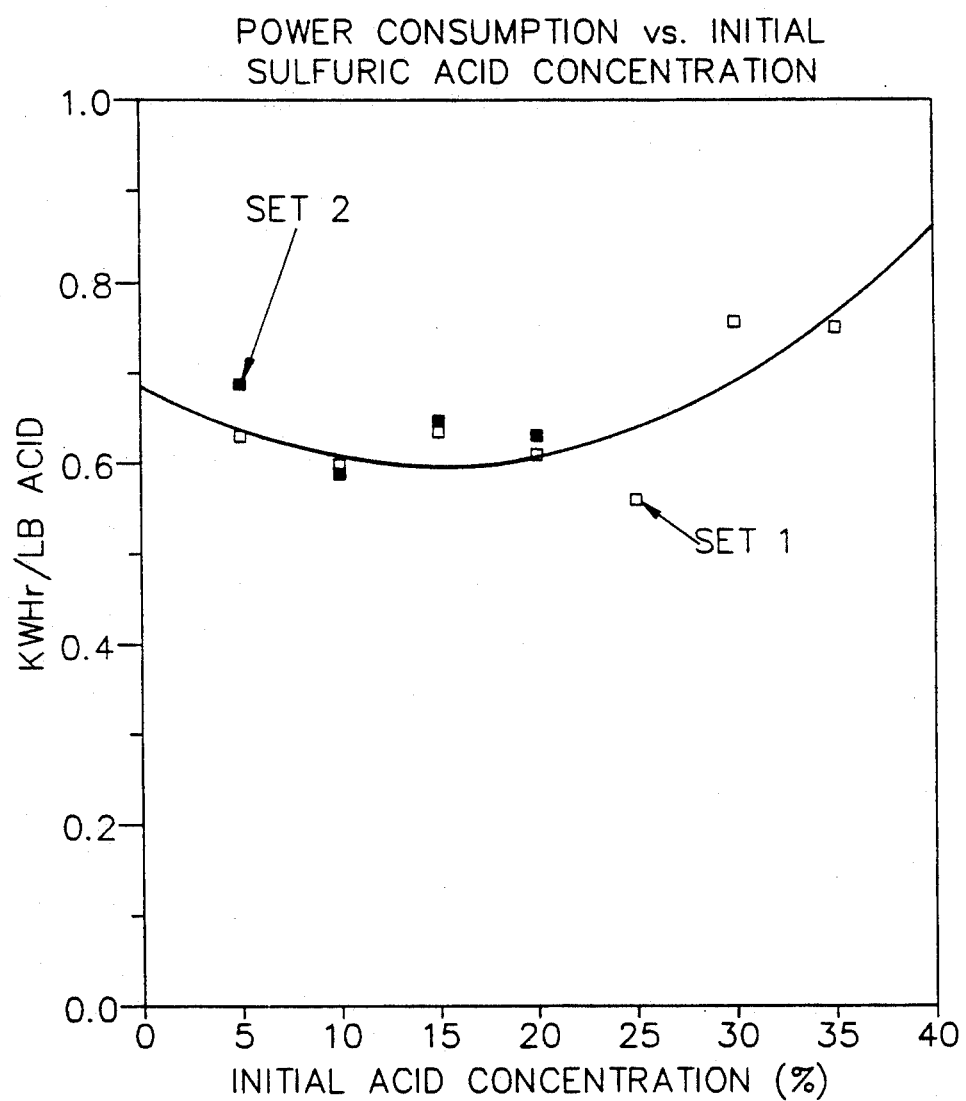
FIG. 17 is a graph plotting power/acid transport ratio versus initial diluate sulfuric acid concentration.
Figure 18:
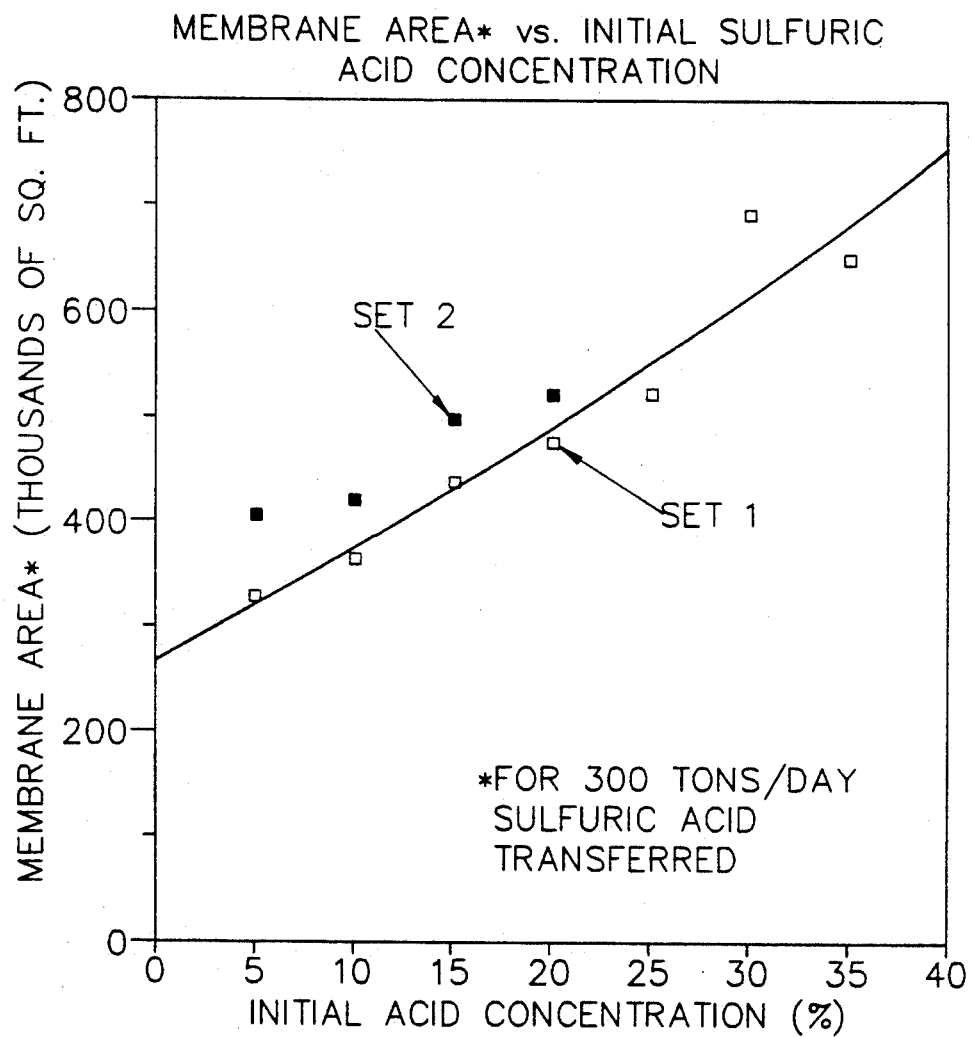
FIG. 18 is a graph plotting required membrane area versus initial diluate sulfuric acid concentration.

Power Consumption and Membrane Area. Despite the lower current efficiency for sulfuric acid the power consumption per pound of acid transferred differs little from that for HCl because of the higher molecular weight of the sulfuric acid. FIG. 17 shows an apparent minimum for power consumption between 10 and 20 percent initial acid. The values with and without sugar are similar because the lower current efficiency in the presence of sugar is offset by the lower voltage drop. As shown in FIG. 18, membrane area requirements increase with increasing acid concentration, and are somewhat greater in the presence of sugar. These trends are directly related to current efficiency.

The foregoing examples are illustrative of the present invention, and are not to be construed as limiting thereof. The invention is defined by the following claims, with equivalents of the claims to be included therein.

That which is claimed is:

1. A method for recovering the acid component of an acid-sugar hydrolyzate in an electrodialysis apparatus including at least one acid concentrate compartment, at least one acid concentrate compartment, at least one diluate compartment and an anode-cathode pair across said electrodialysis apparatus, said method comprising the steps of:

(a) continuously passing said acid-sugar hydrolyzate through said diluate compartment, said hydrolyzate including cellulose hydrolysis products and at least one of the group consisting of hydrochloric acid having an initial concentration of between 14 and 17 percent and sulfuric acid having an initial concentration of between 9 and 11 percent;

(b) continuously passing a carrier fluid through said acid concentrate compartment; and (c) maintaining a current between said anode-cathode pair which forces anions and cations of said acid component to separate from said hydrolyzate and migrate into said concentrate within said at least one acid concentrate compartment, with the proviso that if hydrochloric acid is the acid passed through the diluate compartment in step (a), the current efficiency resulting from the maintenance of said current is between 0.45 and 0.75 Moles/F-/Cell.

2. A method according to claim 1, in which said hydrolyzate contains hydrochloric acid having an initial concentration of between 14 and 17 percent.

3. A method according to claim 1, in which said hydrolyzate contains sulfuric acid having an initial concentration of between 9 and 11 percent.

4. A method according to claim 1, in which said cellulose hydrolysis products have an initial concentration of between 0.5 and 5.0 parts sugars to one part acid.

5. A method according to claim 2, in which said cellulose hydrolysis products have an initial concentration of between 3.25 and 4.25 parts cellulose to one part hydrochloric acid.

6. A method according to claim 3, in which said cellulose hydrolysis products have an initial concentration of between 0.75 and 1.25 parts cellulose to one part sulfuric acid.

7. A method according to claim 2, in which said current produces a power/acid transport ratio of between 0.35 and 0.70 KWhr/lbHCl.

8. A method according to claim 2, in which said current produces a power/acid transport ratio of between 0.47 and 0.53 KWhr/lbHCl.

9. A method according to claim 3, in which said current creates a power/acid transported ratio of between 0.55 and 0.75 KWhr/lbH$_2$SO$_4$.

10. A method according to claim 3, in which said current creates a power/acid transported ratio of between 0.57 and 0.63 KWhr/lbH$_2$SO$_4$.

11. A method according to claim 2, in which said method ceases when said acid concentrate concentration reaches between 19 and 21 percent.

12. A method according to claim 3, in which said method ceases when said acid concentrate concentration reaches between 22 and 24 percent.

13. A method according to claim 2, in which current efficiency resulting from said current is between 0.57 and 0.63 M/F/cell.

14. A method according to claim 3, in which current efficiency resulting from said current is between 0.15 and 0.27 Moles/F/Cell.

15. A method according to claim 3, in which current efficiency resulting from said current is between 0.22 and 0.24 Moles/F/Cell.

16. A method according to claim 1, in which said carrier fluid is water.

17. A method according to claim 2, in which said carrier fluid contains hydrochloric acid.

18. A method according to claim 3, in which said carrier fluid contains sulfuric acid.

19. A method for recovering the acid component of an acid-sugar hydrolyzate in an electrodialysis apparatus including at least one acid concentrate compartment, at least one diluate compartment, and an anode-cathode pair for providing current across said electrodialysis apparatus, said method comprising the steps of:

(a) continuously passing said acid-sugar hydrolyzate through said diluate compartment, said hydrolyzate including cellulose hydrolysis products and at least one of the group consisting of hydrochloric acid and sulfuric acid;

(b) continuously passing a carrier fluid through said acid concentrate compartment;

(c) maintaining a current between said anode-cathode pair which forces anions and cations of said acid component to separate from said hydrolyzate and migrate into said concentrate within said at least one acid concentrate compartments; and (d) ceasing steps (a)-(c) when acid concentration of said concentrate reaches a predetermined level, said predetermined level being between 15 and 25 percent for recovery of hydrochloric acid and being between 18 and 28 percent for recovery of sulfuric acid.

20. A method according to claim 19, in which said acid component of said hydrolyzate is hydrochloric acid, and in which said predetermined concentration of hydrochloric acid for ceasing said method is between 19 and 21 percent.

21. A method according to claim 19, in which said acid component of said hydrolyzate is sulfuric acid, and in which said predetermined concentration of sulfuric acid for ceasing said method is between 21 and 23 percent.

22. A method according to claim 20, in which initial acid concentration of said hydrolyzate is between 12 and 19 percent.

23. A method according to claim 21, in which initial acid concentration of said hydrolyzate is between 6 and 14 percent.

24. A method according to claim 20, in which current efficiency produced by said current is between 0.45 and 0.75 Moles/F/Cell.

25. A method according to claim 20, in which current efficiency produced by said current is between 0.57 and 0.63 Moles/F/Cell.

26. A method according to claim 21, in which current efficiency produced by said current is between 0.15 and 0.27 Moles/F/Cell.

27. A method according to claim 21, in which current efficiency produced by said current is between 0.22 and 0.24 Moles/F/Cell.

28. A method according to claim 20, in which power/acid transport ratio resulting from said current is between 0.35 and 0.70 KWhr/lbHCl.

29. A method according to claim 20, in which power/acid transport ratio resulting from said current is between 0.47 and 0.53 KWhr/lbHCl.

30. A method according to claim 21, in which power/acid transport ratio resulting from said current is between 0.55 and 0.75 KWhr/lbH$_2$SO$_4$.

31. A method according to claim 21, in which power/acid transport ratio resulting from said current is between 0.57 and 0.63 KWhr/lbH$_2$SO$_4$.

32. A method according to claim 20, in which said carrier fluid is water.

33. A method according to claim 20, in which said carrier fluid contains hydrochloric acid.

34. A method according to claim 21, in which said carrier fluid is water.

35. A method according to claim 21, in which said carrier fluid contains sulfuric acid.

36. A method according to claim 20, in which said hydrolyzate includes cellulose hydrolysis products in concentration of between 3.25 and 4.25 parts sugars to one part hydrochloric acid.

37. A method according to claim 21, in which said hydrolyzate includes cellulose hydrolysis products in concentration of between 0.75 and 1.25 parts cellulose to one part sulfuric acid.

38. A method for recovering the acid component of an acid-sugar hydrolyzate in an electrodialysis apparatus including at least one acid concentrate compartment, at least one diluate compartment, and an anode and cathode pair for providing electric current across said electrodialysis apparatus, said method comprising the steps of:

(a) continuously passing said acid-sugar hydrolyzate through said diluate compartment, said hydrolyzate including hydrochloric acid in concentration of between 14 and 17 percent and sugar concentration of between 3.25 and 4.25 parts sugar to one part hydrochloric acid;

(b) continuously passing a hydrochloric acid solution through said acid concentration compartment; and (c) maintaining a current between said anode-cathode pair which forces anions and cations of said acid component to separate from said hydrolyzate and migrate into said concentrate within said at least one acid concentrate compartments, said current producing a current efficiency across said electrodialysis apparatus of between 0.57 and 0.63 Moles/F/Cell and resulting in a power/acid transport ratio of between 0.47 and 0.53 KWhr/lbHCl.

39. A method according to claim 19, further comprising the step of ceasing said current when the concentration of said hydrochloric acid solution is between 19 and 21 percent.

* * * * *

UNITED STATES PATENT AND TRADEMARK OFFICE
CERTIFICATE OF CORRECTION

PATENT NO. : 5,244,553

DATED : Sept. 14, 1993

INVENTOR(S) : Irving S. Goldstein

It is certified that error appears in the above-identified patent and that said Letters Patent is hereby corrected as shown below:

Column 3, Line 62, change "$SC_4^{2-}$" to read --$SO_4^{2-}$--.

Column 14, Line 42, after "including" delete --at least one acid concentrate compartment--.

Signed and Sealed this

Fourteenth Day of June, 1994

BRUCE LEHMAN

Attest:

Attesting Officer    Commissioner of Patents and Trademarks